US012756636B2

(12) United States Patent
Bejjipuram et al.

(10) Patent No.: US 12,756,636 B2
(45) Date of Patent: Oct. 6, 2026

(54) MACHINE LEARNING ASSISTED RADIO RESOURCE MANAGEMENT (RRM) POLICIES FOR HIGH DATA RATE LOW LATENCY AND OTHER APPLICATIONS IN O-RAN NETWORKS

(71) Applicant: Mavenir Systems, Inc., Richardson, TX (US)

(72) Inventors: Sombabu Bejjipuram, Andhra Pradesh (IN); Mukesh Taneja, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 19/038,029

(22) Filed: Jan. 27, 2025

(65) Prior Publication Data

US 2025/0247304 A1 Jul. 31, 2025

(30) Foreign Application Priority Data

Jan. 31, 2024 (IN) ............................ 202441006300

(51) Int. Cl.

*H04L 41/16* (2022.01)
*H04B 7/06* (2006.01)
*H04L 41/147* (2022.01)

(52) U.S. Cl.

CPC ........... *H04L 41/16* (2013.01); *H04B 7/0626* (2013.01); *H04L 41/147* (2013.01)

(58) Field of Classification Search

CPC ...... H04L 41/16; H04L 41/147; H04B 7/0626
See application file for complete search history.

(56) References Cited

U.S. PATENT DOCUMENTS 11,949,465 B2 * 4/2024 Prasad .................. G06N 20/00
2017/0164229 A1 * 6/2017 Callard ................ H04L 47/722
(Continued)

FOREIGN PATENT DOCUMENTS

EP 4554324 A1 5/2025
WO 2023091664 A1 5/2023

OTHER PUBLICATIONS

3rd Generation Partnership Project (3GPP) TS 38.300 V 17.4.0 "Technical Specification Group Radio Access Network; NR; NR and NG-RAN Overall Description; Stage 2 (Release 17)" Mar. 2023; 3rd Generation Partnership Project, Valbonne, France.
(Continued)

*Primary Examiner* — Patrice L Winder
(74) *Attorney, Agent, or Firm* — Ruggiero McAllister & McMahon LLC

(57) ABSTRACT

A method for implementing enhanced radio resource management of open radio access network (O-RAN) based on machine-learning-based technique, includes: sending, from a distributed unit (DU) of the O-RAN to a traffic prediction analytics module, values of at least one network performance parameter comprising buffer occupancy (BO) for a plurality of data radio bearers (DRBs) at 5G Quality of Service Identifier (5QI) level; deploying, at the traffic prediction analytics module, a Long Short-Term Memory (LSTM) neural network comprising at least one LSTM unit for data traffic prediction of one of per-DRB data traffic or per-logical channel (LC) traffic for each one of a plurality of logical channels (LCs) based on the at least one network performance parameter; and deriving, by the traffic prediction analytics module based on at least the data traffic prediction, a set of parameters defining a policy for determining a scheduling priority of each one the LCs.

17 Claims, 19 Drawing Sheets

(56) References Cited

U.S. PATENT DOCUMENTS

| | | | | |
|---|---|---|---|---|
| 2021/0037390 | A1* | 2/2021 | Tofighbakhsh | H04W 48/18 |
| 2021/0258866 | A1 | 8/2021 | Chou | |
| 2022/0330090 | A1* | 10/2022 | Han | H04W 28/086 |
| 2023/0128069 | A1* | 4/2023 | Alabbasi | H04W 72/542 370/329 |
| 2023/0217304 | A1* | 7/2023 | Singh | H04W 28/0278 370/329 |
| 2023/0413152 | A1* | 12/2023 | Zhu | H04W 36/32 |

OTHER PUBLICATIONS

3rd Generation Partnership Project (3GPP) TS 23.501 V 18.1 "Technical Specification Group Services and System Aspects; System architecture for the 5G System (5GS); Stage 2; (Release 18)" Mar. 2023; 3rd Generation Partnership Project, Valbonne, France.

3rd Generation Partnership Project (3GPP) TS 38.401 V 17.4.0 "Technical Specification Group Radio Access Network; NG-RAN; Architecture description (Release 17)" Mar. 2023; 3rd Generation Partnership Project, Valbonne, France.

Extended European search report for corresponding application EP251555174.3; 11 pages, dated Jun. 27, 2025.

* cited by examiner

DNN: Data Network Name, QFI: QoS Flow Identifier, UPF: User Plane Function (of 5G Core), 5QI: 5G QoS Identifier,
DRB: Data Radio Bearer, GBR: Guaranteed Bit Rate, SST: Slice / Service Type, SDD: Slice Differentiator

MACHINE LEARNING ASSISTED RADIO RESOURCE MANAGEMENT (RRM) POLICIES FOR HIGH DATA RATE LOW LATENCY AND OTHER APPLICATIONS IN O-RAN NETWORKS

CROSS-REFERENCE TO RELATED APPLICATIONS

The present application claims priority to Indian Provisional Patent Application No. 202441006300 filed on Jan. 31, 2024, the entirety of which is incorporated by reference herein.

BACKGROUND OF THE DISCLOSURE

1. Field of the Disclosure

The present disclosure is related to Open Radio Access Network (O-RAN) wireless networks, and relates more particularly to machine-learning-assisted radio resource management (RRM) policies for high data rate Low Latency and other applications in O-RAN Networks policy-based network performance management in O-RAN networks.

2. Description of Related Art

In the following sections, overview of Next Generation Radio Access Network (NG-RAN) architecture and 5G New Radio (NR) stacks will be discussed. 5G NR (New Radio) user and control plane functions with monolithic gNB (gNodeB) are shown in FIGS. 1*a*, 1*b* and 2. For the user plane (shown in FIG. 1*a*, which is in accordance with 3GPP TS 38.300), PHY (physical), MAC (Medium Access Control), RLC (Radio Link Control), PDCP (Packet Data Convergence Protocol) and SDAP (Service Data Adaptation Protocol) sublayers originate in the UE 101 and are terminated in the gNB 102 on the network side.

As shown in FIG. 1*b*, which is a block diagram illustrating the user plane protocols stacks for a PDU session, in accordance with 3GPP TS 23.501), PDU layer 9010 corresponds to the PDU carried between the UE 101 and the data network (DN) 9011 over the PDU session. As shown in FIG. 1*b*, UE 101 is connected to the 5G access network (AN) 902, which AN 902 is in turn connected via the N3 interface to the Intermediate UPF (I-UPF) 903*a* portion of the UPF 903, which I-UPF 903*a* is in turn connected via the N9 interface to the PDU session anchor 903*b* portion of the UPF 903, and which PDU session anchor 903*b* is connected to the DN 9011. The PDU session can correspond to IPv4, IPv6, or both types of IP packets, when the PDU session is of type IPv4, IPv6 or IPv4v6, respectively. GTP-U shown in FIG. 1*b* supports tunnelling user plane data over N3 and N9 interfaces, and provides encapsulation of end user PDUs for N3 and N9 interfaces.

For the control plane (shown in FIG. 2, which is in accordance with 3GPP TS 38.300), RRC (Radio Resource Control), PDCP, RLC, MAC and PHY sublayers originate in the UE 101 and are terminated in the gNB 102 on the network side, and NAS (Non-Access Stratum) originate in the UE 101 and is terminated in the AMF (Access Mobility Function) 103 on the network side.

NG-Radio Access Network (NG-RAN) architecture from 3GPP TS 38.401 is shown in FIGS. 3-4. As shown in FIG. 3, the NG-RAN 301 consists of a set of gNBs 302 connected to the 5GC 303 through the NG interface. Each gNB comprises gNB-CU 304 and one or more gNB-DU 305 (see FIG. 3). As shown in FIG. 4 (which illustrates separation of CU-CP (CU-Control Plane) and CU-UP (CU-User Plane)), E1 is the interface between gNB-CU-CP (CU-Control Plane) 304*a* and gNB-CU-UP (CU-User Plane) 304*b*, F1-C is the interface between gNB-CU-CP 304*a* and gNB-DU 305, and F1-U is the interface between gNB-CU-UP 304*b* and gNB-DU 305. As shown in FIG. 4, gNB 302 can consist of a gNB-CU-CP 304*a*, multiple gNB-CU-Ups 304*b* and multiple gNB-DUs 305. One gNB-DU 305 is connected to only one gNB-CU-CP 304*a*, and one gNB-CU-UP 304*b* is connected to only one gNB-CU-CP 304*a*.

In this section, an overview of Layer 2 (L2) of 5G NR will be provided in connection with FIGS. 5-7. L2 of 5G NR is split into the following sublayers (in accordance with 3GPP TS 38.300):

1) Medium Access Control (MAC) 501 in FIGS. 5-7: The MAC sublayer offers Logical Channels (LCs) to the RLC sublayer. This layer runs a MAC scheduler to schedule radio resources across different LCs (and their associated radio bearers).
2) Radio Link Control (RLC) 502 in FIGS. 5-7: The RLC sublayer offers RLC channels to the Packet Data Convergence Protocol (PDCP) sublayer. The RLC sublayer supports three transmission modes: RLC-Transparent Mode (RLC-TM), RLC-Unacknowledged Mode (RLC-UM) and RLC-Acknowledgement Mode (RLC-AM). RLC configuration is per logical channel. It hosts ARQ (Automatic Repeat Request) protocol for RLC-AM mode.
3) Packet Data Convergence Protocol (PDCP) 503 in FIGS. 5-7: The PDCP sublayer offers Radio Bearers (RBs) to the SDAP sublayer. There are two types of Radio Bearers: Data Radio Bearers (DRBs) for data, and Signaling Radio Bearers (SRBs) for control plane.
4) Service Data Adaptation Protocol (SDAP) 504 in FIGS. 5-7: The SDAP offers QoS Flows to the 5GC (5G Core). This sublayer provides mapping between a QoS flow and a DRB. It marks QoS Flow Id in DL (downlink) as well as UL (uplink packets).

FIG. 5 is a block diagram illustrating DL L2 structure, in accordance with 3GPP TS 38.300. FIG. 6 is a block diagram illustrating UL L2 structure, in accordance with 3GPP TS 38.300. FIG. 7 is a block diagram illustrating L2 data flow example, in accordance with 3GPP TS 38.300 (in FIG. 7, H denotes headers or sub-headers).

Open Radio Access Network (O-RAN) is based on disaggregated components which are connected through open and standardized interfaces based on 3GPP NG-RAN. An overview of O-RAN with disaggregated RAN CU (Centralized Unit), DU (Distributed Unit), and RU (Radio Unit), near-real-time Radio Intelligent Controller (RIC) and non-real-time RIC is illustrated in FIG. 8.

As shown in FIG. 8, the CU (shown split as O-CU-CP 801*a* and O-CU-UP 801*b*) and the DU (shown as O-DU 802) are connected using the F1 interface (with F1-C for control plane and F1-U for user plane traffic) over a mid-haul (MH) path. One DU can host multiple cells (e.g., one DU could host 24 cells) and each cell may support many users. For example, one cell may support 600 Radio Resource Control (RRC)-connected users and out of these 600, there may be 200 Active users (i.e., users that have data to send at a given point of time).

A cell site can comprise multiple sectors, and each sector can support multiple cells. For example, one site could comprise three sectors and each sector could support eight cells (with eight cells in each sector on different frequency bands). One CU-CP (CU-Control Plane) could support multiple DUs and thus multiple cells. For example, a CU-CP could support 1,000 cells and around 100,000 User Equipments (UEs). Each UE could support multiple Data Radio Bearers (DRB) and there could be multiple instances of CU-UP (CU-User Plane) to serve these DRBs. For example, each UE could support 4 DRBs, and 400,000 DRBs (corresponding to 100,000 UEs) may be served by five CU-UP instances (and one CU-CP instance).

The DU could be located in a private data center, or it could be located at a cell-site. The CU could also be in a private data center or even hosted on a public cloud system. The DU and CU, which are typically located at different physical locations, could be tens of kilometers apart. The CU communicates with a 5G core system, which could also be hosted in the same public cloud system (or could be hosted by a different cloud provider). A RU (Radio Unit) (shown as O-RU 803 in FIG. 8) is located at a cell-site and communicates with the DU via a front-haul (FH) interface.

The E2 nodes (CU and DU) are connected to the near-real-time RIC 132 using the E2 interface. The E2 interface is used to send data (e.g., user and/or cell KPMs) from the RAN, and deploy control actions and policies to the RAN at near-real-time RIC 132. The application or service at the near-real-time RIC 132 that deploys the control actions and policies to the RAN are called xApps. During the E2 setup procedures, the E2 node advertises the metrics it can expose, and an xApp in the near-RT RIC can send a subscription message specifying key performance metrics which are of interest. The near-real-time RIC 132 is connected to the non-real-time RIC 133 (which is shown as part of Service Management and Orchestration (SMO) Framework 805 in FIG. 8) using the A1 interface. Also shown in FIG. 8 are O-eNB 806 (which is shown as being connected to the near-real-time RIC 132 and the SMO Framework 805) and O-Cloud 804 (which is shown as being connected to the SMO Framework 805).

In this section, PDU sessions, DRBs, and quality of service (QoS) flows will be discussed. In 5G networks, PDU connectivity service is a service that provides exchange of PDUs between a UE and a data network identified by a Data Network Name (DNN). The PDU Connectivity service is supported via PDU sessions that are established upon request from the UE. The DNN defines the interface to a specific external data network. One or more QoS flows can be supported in a PDU session. All the packets belonging to a specific QoS flow have the same 5QI (5G QoS Identifier). A PDU session consists of the following: Data Radio Bearer which is between UE and CU in RAN; and an NG-U GTP tunnel which is between CU and UPF (User Plane Function) in the core network. FIG. 9 illustrates an example PDU session (in accordance with 3GPP TS 23.501) consisting of multiple DRBs, where each DRB can consist of multiple QoS flows. In FIG. 9, three components are shown for the PDU session 901: UE 101; access network (AN) 902; and UPF 903, which includes Packet Detection Rules (PDRs) 9031.

The following should be noted for 3GPP 5G network architecture, which is illustrated in FIG. 10 (in the context of multiple PDU sessions involving multiple DRBs and QoS Flow Identifiers (QFIs), which PDU sessions are implemented involving UE 101, gNodeB 102, UPF 903, and DNNs 9011*a* and 9011*b*) and FIG. 11 (in the context of Radio Resource Management (RRM) for connecting UE 101 to the network via RU 306 with a MAC Scheduler 1001):

1) The transport connection between the base station (i.e., CU-UP 304*b* of FIG. 11) and the UPF 903 uses a single GTP-U tunnel per PDU session, as shown in FIGS. 10 and 11. The PDU session is identified using GTP-U TEID (Tunnel Endpoint Identifier).
2) The transport connection between the DU 305 and the CU-UP 304*b* of FIG. 11 uses a single GTP-U tunnel per DRB (see also FIG. 10 signal flows).
3) SDAP:
   a) The SDAP (Service Adaptation Protocol) 504 Layer receives downlink data from the UPF 903 across the NG-U interface (see FIG. 11).
   b) The SDAP 504 maps one or more QoS Flow(s) onto a specific DRB.
   c) The SDAP header is present between the UE 101 and the CU (when reflective QoS is enabled), and includes a field to identify the QoS flow within a specific PDU session.
4) User plane (UP) protocol includes a field to identify the QoS flow and is present between CU and UPF 903 (in the core network).
5) One (logical) RLC queue is implemented per DRB (or per logical channel), as shown in FIG. 11.

In this section, standardized 5QI to QoS characteristics mapping will be discussed. As per 3GPP TS 23.501, the one-to-one mapping of standardized 5QI values to 5G QoS characteristics is specified in Table 1 shown below. The first column represents the 5QI value. The second column lists the different resource types, i.e., as one of Non-GBR, GBR, Delay-critical GBR. The third column ("Default Priority Level") represents the priority level Priority5QI, for which lower the value the higher the priority of the corresponding QoS flow. The fourth column represents the Packet Delay Budget (PDB), which defines an upper bound for the time that a packet may be delayed between the UE and the N6 termination point at the UPF. The fifth column represents the Packet Error Rate (PER). The sixth column represents the maximum data burst volume for delay-critical GBR types. The seventh column represents averaging window for GBR, delay critical GBR types.

For example, as shown in Table 1, 5QI value 1 is of resource type GBR with the default priority value of 20, PDB of 100 ms, PER of 0.01, and averaging window of 2000 ms. Conversational voice falls under this category. Similarly, as shown in Table 1, 5QI value 7 is of resource type Non-GBR with the default priority value of 70, PDB of 100 ms and PER of 0.001. Voice, video (live streaming), and interactive gaming fall under this category.

TABLE 1

| 5QI Value | Resource Type | Default Priority Level | Packet Delay Budget (Note 3) | Packet Error Rate | Default Maximum Data Burst Volume (Note 2) | Default Averaging Window | Example Services |
|---|---|---|---|---|---|---|---|
| 1 | GBR Note 1 | 20 | 100 ms (Note 11, Note 13) | $10^{-2}$ | N/A | 2000 ms | Conversational Voice |
| 2 | GBR Note 1 | 40 | 150 ms (Note 11, Note 13) | $10^{-3}$ | N/A | 2000 ms | Conversational Video (Live Streaming) |

TABLE 1-continued

| 5QI Value | Resource Type | Default Priority Level | Packet Delay Budget (Note 3) | Packet Error Rate | Default Maximum Data Burst Volume (Note 2) | Default Averaging Window | Example Services |
|---|---|---|---|---|---|---|---|
| 3 | GBR Note 1 | 30 | 50 ms (Note 11, Note 13) | $10^{-3}$ | N/A | 2000 ms | Real Time Gaming, V2X messages (see TS 23.287 [121]). Electricity distribution - medium voltage, Process automation monitoring |
| 4 | GBR Note 1 | 50 | 300 ms (Note 11, Note 13) | $10^{-6}$ | N/A | 2000 ms | Non-Conversational Video (Buffered Streaming) |
| 65 (Note 9, Note 12) | GBR Note 1 | 7 | 75 ms (Note 7, Note 8) | $10^{-2}$ | N/A | 2000 ms | Mission Critical user plane Push To Talk voice (e.g., MCPTT) |
| 66 (Note 12) | GBR Note 1 | 20 | 100 ms (Note 10, Note 13) | $10^{-2}$ | N/A | 2000 ms | Non-Mission-Critical user plane Push To Talk voice |
| 67 (Note 12) | GBR Note 1 | 15 | 100 ms (Note 10, Note 13) | $10^{-3}$ | N/A | 2000 ms | Mission Critical Video user plane |
| 75 (Note 14) | GBR Note 1 | | | | | | |
| 71 | GBR Note 1 | 56 | 150 ms (Note 11, Note 13, Note 15) | $10^{-6}$ | N/A | 2000 ms | "Live" Uplink Streaming (e.g. TS 26.238 [78]) |
| 72 | GBR Note 1 | 56 | 300 ms (Note 11, Note 13, Note 15) | $10^{-4}$ | N/A | 2000 ms | "Live" Uplink Streaming (e.g. TS 26.238 [76]) |
| 73 | GBR Note 1 | 56 | 300 ms (Note 11, Note 13, Note 15) | $10^{-8}$ | N/A | 2000 ms | "Live" Uplink Streaming (e.g. TS 26.238 [76]) |
| 74 | GBR Note 1 | 56 | 500 ms (Note 11, Note 15) | $10^{-8}$ | N/A | 2000 ms | "Live" Uplink Streaming (e.g. TS 26.238 [76]) |
| 76 | GBR Note 1 | | 500 mg (Note 11, Note 93, Note 15) | $10^{-4}$ | N/A | 2000 ms | "Live" Uplink Streaming (e.g. TS 28.238 [76]) |
| 5 | Non-GBR Note 1 | 10 | 100 ms Note 10, Note 13) | $10^{-6}$ | NA | N/A | IMS Signalling |
| 6 | Non-GBR Note 1 | 60 | 300 ms (Note 10, Note 13) | $10^{-6}$ | N/A | N/A | Video (Buffered Streaming) TCP-based (e.g., www, e-mail, chat, ftp, p2p file sharing, progressive video, etc.) |
| 7 | Non-GBR Note 1 | 70 | 100 ms (Note 10, Note 13) | $10^{-3}$ | N/A | N/A | Voice, Video (Live Streaming) Interactive Gaming |

In this section, Radio Resource Management (RRM) will be discussed (a block diagram for an example RRM with a MAC Scheduler is shown in FIG. 11). L2 methods (such as MAC scheduler) play a critical role in allocating radio resources to different UEs in a cellular network. The scheduling priority of a logical channel ($P_{LC}$) is determined as part of MAC scheduler using one of the following:

$$P_{LC} = W_{5QI} * P_{5QI} + W_{GBR} * P_{GBR} + W_{PDB} * P_{PDB} + W_{PF} * P_{PF}, \text{ or}$$

$$P_{LC} = (W_{5QI} * P_{5QI} + W_{PF} * P_{PF}) * \text{maximum}(W_{GBR} * P_{GBR}, W_{PDB} * P_{PDB})$$

Once one of the above methods is used to compute scheduling priority of a logical channel corresponding to a UE in a cell, the same method is used for all other UEs.

In the above expressions, the parameters are defined as follows:

a) $P_{5QI}$ is the priority metric corresponding to the QoS class (5QI) of the logical channel. Incoming traffic from a DRB is mapped to Logical Channel (LC) at RLC level. $P_{5QI}$ is the default 5QI priority value, $\text{Priority}_{5QI}$, of a QoS flow that is mapped to the current LC. The lower the value of $\text{Priority}_{5QI}$ the higher the priority of the corresponding QoS flow. For example, Voice over New Radio (VoNR) (with 5QI of 1) will have a much higher $P_{5QI}$ compared to web browsing (with 5QI of 9).

b) $P_{GBR}$ is the priority metric corresponding to the target bit rate of the corresponding logical channel. The GBR metric $P_{GBR}$ represents the fraction of data that must be delivered to the UE within the time left in the current averaging window $T_{avg\_win}$ (as per 5QI table, default is 2000 msec.) to meet the UE's GBR requirement. $P_{GBR}$ is calculated as follows:

$$P_{GBR} = remData/targetData$$

where targetData is the total data bits to be served in each averaging window $T_{avg\_win}$ in order to meet the GFBR of the given QoS flow;

remData is the amount of data bits remaining to be served within the time left in the current averaging window;

$Priority_{GBR}$ is reset to 1 at the start of each averaging window $T_{avg\_win}$, and should go down to 0 towards the end of this window if the GBR criterion is met; and $Priority_{GBR}=0$ for non-GBR flows.

c) $P_{PDB}$ is the priority metric corresponding to the packet delay budget at DU for the corresponding logical channel. $P_{PDB}=1$ if $PDB^{DU} <= QDelay_{RLC}$ and $P_{PDB}=1/(PDB^{DU}-QDelay_{RLC})$ if $PDB^{DU} > QDelay_{RLC}$ where both $PDB^{DU}$ (Packet Delay Budget at DU) and RLC Queuing delay, $QDelay_{RLC}$, are measured in terms of slots. $QDelay_{RLC}=(t-T_{RLC})$ is the delay of the oldest RLC packet in the QoS flow that has not been scheduled yet, and it is calculated as the difference in time between the SDU insertion in RLC queue to current time where t:=current time instant, $T_{RLC}$:=time instant when oldest SDU was inserted in RLC.

d) $P_{PF}$ is the priority metric corresponding to proportional fair metric of the UE. $P_{PF}$ is the classical PF Metric, calculated on a per UE basis as $P_{PF}=r/R_{avg}$ where r: UE spectral efficiency calculated based on one RB & it's last reported CQI; and $R_{avg}=a \cdot R_{avg}+(1-a) \cdot b$, UE's average throughput, where b>=0 is #bits scheduled in current TTI and 0<a<=1 is the HR filter coefficient.

e) In addition, the following weights are defined: $W_{5QI}$ is the weight of $P_{5QI}$; f) $W_{GBR}$ is the weight of $P_{GBR}$; g) $W_{PDB}$ is the weight of $P_{PDB}$; and h) $W_{PF}$ is the weight of $P_{PF}$. Each of the above weights is set to a value between 0 and 1.

RRM methods (such as MAC scheduler) play a critical role in deciding how to allocate resources to different DRBs (LCs) and UEs in a cell. These methods have access to current (and past) network parameters, but these methods have no information related to how some of these network parameters may evolve. With high data rate, low latency applications (such as augmented reality (AR), virtual reality (VR), and extended reality (XR)), base station (or DU) can suddenly experience a big burst of data traffic in a small interval of time, and the base station (or DU) may not be able to serve the burst of data traffic properly (and may degrade the performance of other users as well).

Accordingly, there is a need for an enhanced system and method to predict the values of network parameters for a future time interval, thereby enabling more efficient RRM methods.

SUMMARY

Accordingly, what is desired is a system and method to achieve more efficient radio resource management (RRM) by utilizing machine-learning-based methods to predict the values of network parameters for a future time interval.

According to an example embodiment, enhanced RRM utilizing machine-learning-based method is implemented, e.g., by predicticting per-DRB (or per-LC) traffic for each LC and using the predicted traffic (and predicted CSI from UE) to provide different types of radio resource management policies.

According to an example embodiment, enhanced RRM utilizing machine-learning-based method is implemented by utilizing various statistical learning (time series forecasting) techniques such as Autoregressive (AR), Moving average (MA), Autoregressive Moving Average (ARMA), and/or Autoregressive Integrated Moving Average (ARIMA), along with machine learning (ML) techniques such as Long Short-term Memory (LSTM) and/or its variants (which excel at capturing complex patterns and long-term dependencies) for time series forecasting.

According to an example embodiment, enhanced RRM utilizing machine-learning-based method is implemented by training a model at a near-real-time RAN Intelligent Controller (near-RT RIC), or at a CU-UP, or at an analytics server.

According to an example embodiment, enhanced RRM utilizing machine-learning-based method is implemented by i) downloading the trained model at a distributed unit (DU); ii) communicating, by the DU, various UE and network-related performance measurements to a traffic prediction analytics module; iii) analyzing, by the traffic prediction analytics module using machine learning methods, the UE and network-related performance measurements data to derive an optimum RRM policy; and iv) sending, by the traffic prediction analytics module, the derived RRM policy to the DU.

According to an example embodiment, the derived RRM policy encompasses a set of updated weights and other configuration parameters, e.g., number of layers and number of input observed values, used for prediction.

According to an example embodiment, the LSTM model is enhanced for traffic prediction for O-RAN networks.

According to an example embodiment, enhanced RRM utilizing machine-learning-based method is implemented by utilizing a traffic prediction analytics module located at a near-RT RIC.

According to an example embodiment, enhanced RRM utilizing machine-learning-based method is implemented by utilizing a traffic prediction analytics module located at a CU-UP.

According to an example embodiment, enhanced RRM utilizing machine-learning-based method is implemented by utilizing LSTM ML models for all the DRBs.

According to an example embodiment, enhanced RRM utilizing machine-learning-based method is implemented by utilizing LSTM models only for DRBs which are carrying traffic for high data rate, low latency applications, and the traffic prediction is carried out only for the DRBs that are carrying traffic from the high data rate, low latency applications.

According to an example embodiment, enhanced RRM utilizing machine-learning-based method is implemented by utilizing LSTM Models for only some of the DRBs corresponding to the same 5QIs.

According to an example embodiment, the scheduling priority of a logical channel ($P_{LC}$) is determined as part of MAC scheduler using one of the following:

$$P_{LC}=W_{5QI}*P_{5QI}+W_{GBR}*P_{GBR}+W_{PDB}*P_{PDB}+W_{PF}*P_{PF},\text{ or}$$

$$P_{LC}=(W_{5QI}*P_{5QI}+W_{PF}*P_{PF})*\text{maximum}(W_{GBR}*P_{GBR},\ W_{PDB}*P_{PDB}).$$

According to an example embodiment, the scheduling priority of a logical channel ($P_{LC}$) is determined by using normalized predicted buffer occupancy (BO) for each LC, in one of the following manners:

$$P_{LC}=W_{5QI}*P_{5QI}+W_{GBR}*P_{GBR}+W_{PDB}*P_{PDB}+W_{PF}*P_{PF}+W_{Normalized\_Predicted\_BO\_LC}*P_{Normalized\_Predicted\_BO\_LC}$$

or $$P_{LC}=(W_{5QI}*P_{5QI}+W_{PF}*P_{PF})*\text{maximum}(W_{GBR}*P_{GBR},\ W_{PDB}*P_{PDB},\ W_{Normalized\_Predicted\_BO\_LC}*P_{Normalized\_Predicted\_BO\_LC})$$

According to an example embodiment, enhanced RRM utilizing machine-learning-based method is implemented by utilizing the predicted CSI from the UE in conjunction with the predicted data traffic patterns.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The above-described and other features and advantages of the present disclosure will be appreciated and understood by those skilled in the art from the following detailed description, drawings, and appended claims.

DETAILED DESCRIPTION

In this section, basic structures and characteristics of neural networks will be discussed. Recurrent neural networks (RNNs) are a family of neural networks that are suited for handling sequential data, but RNNs suffer from some limitations. First, RNNs fail to store information for a longer period of time (than for handling sequential data), which means RNNs are incapable of handing "long-term dependencies", i.e., situations in which a reference to certain information stored quite a long time ago is required to predict the current output. Second, there is no fine control over which part of the context needs to be carried forward and how much of the past needs to be "forgotten". Third, RNNs suffer from exploding and vanishing gradients which occur during the training process of a network through backtracking.

Long Short-Term Memory (LSTM) networks, which are an extension of recurrent neural networks (RNNs), have been introduced to handle situations where RNNs do not work well. The basic difference between the architectures of RNNs and LSTMs is that the hidden layer of LSTM is a gated unit or a gated cell, which consists of four layers that interact with one another in a way to produce the output of that cell along with the cell state. The output and the cell state are then passed onto the next hidden layer. Unlike RNNs which have only a single neural net layer of tan h (hyperbolic tangent), LSTMs comprise three logistic sigmoid gates and one tan h layer. It should be noted that output of sigmoid activation function is in the range (0 to 1) for any real value as input, while the output of tan h is in the range (−1 to 1).

Gates are provided in LSTM in order to limit the information that is passed through the cell, i.e., the gates determine which part of the information will be needed by the next cell and which part is to be discarded. The output is usually in the range of 0-1, where "0" means "reject all", and "1" means "include all". Information is retained by the cells, and the memory manipulations are done by the gates. Three gates are provided in LSTM: 1) forget gate; 2) input gate; and 3) output gate, which will be explained in detail in conjunction with FIGS. 12*a*-12*d*.

Figure 1A:
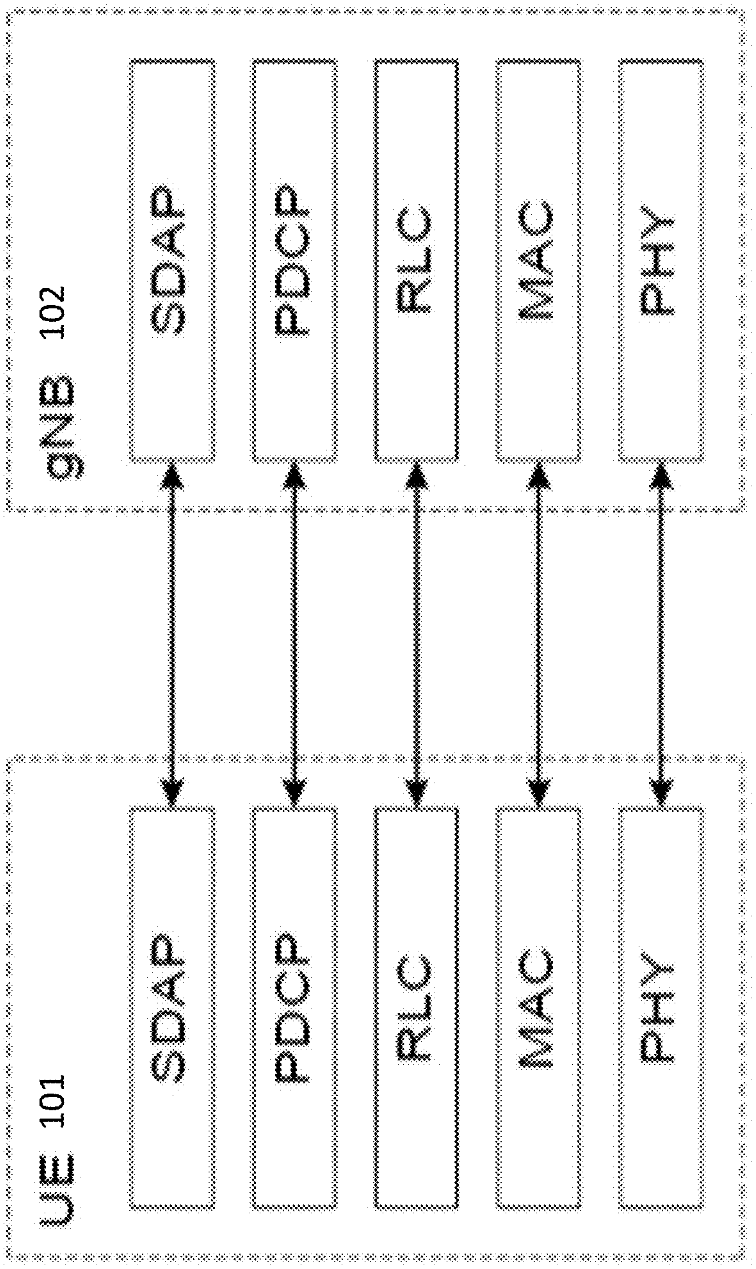
FIG. 1*a* is a block diagram illustrating the user plane stack of 5G NR.
Figure 1B:
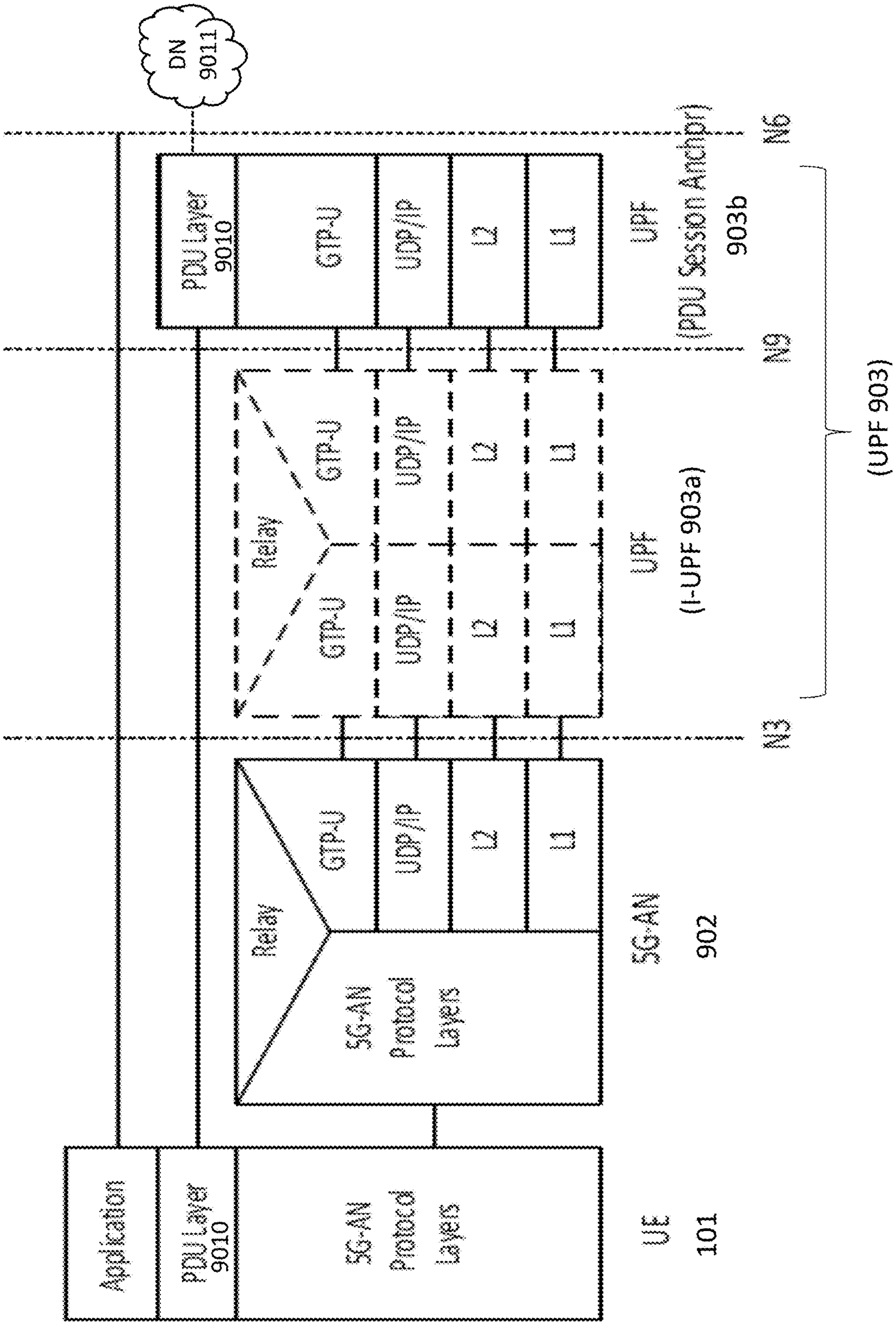
FIG. 1*b* is a block diagram illustrating the user plane protocols stacks for a PDU session.
Figure 2:
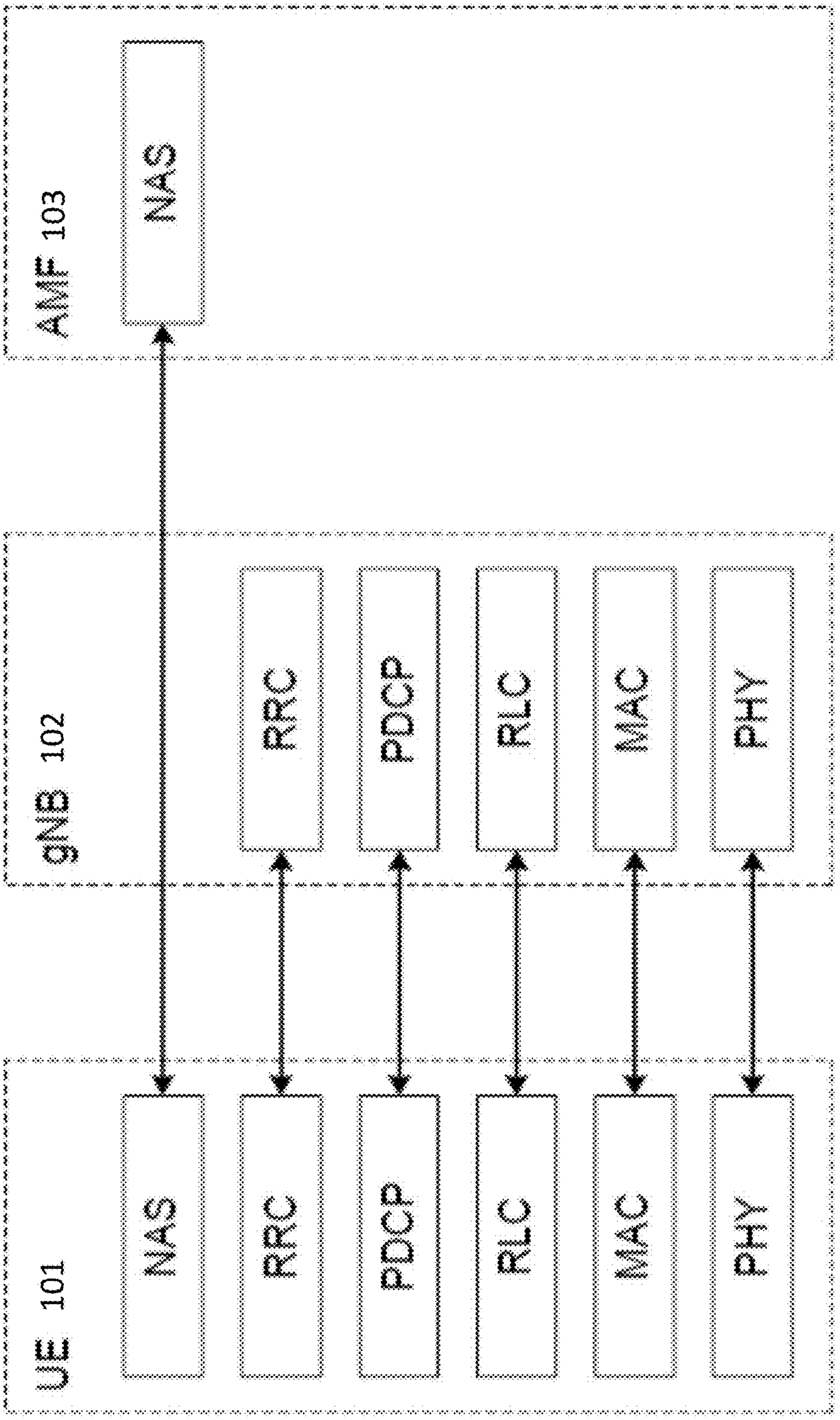
FIG. 2 is a block diagram illustrating the control plane stack of 5G NR.
Figure 3:
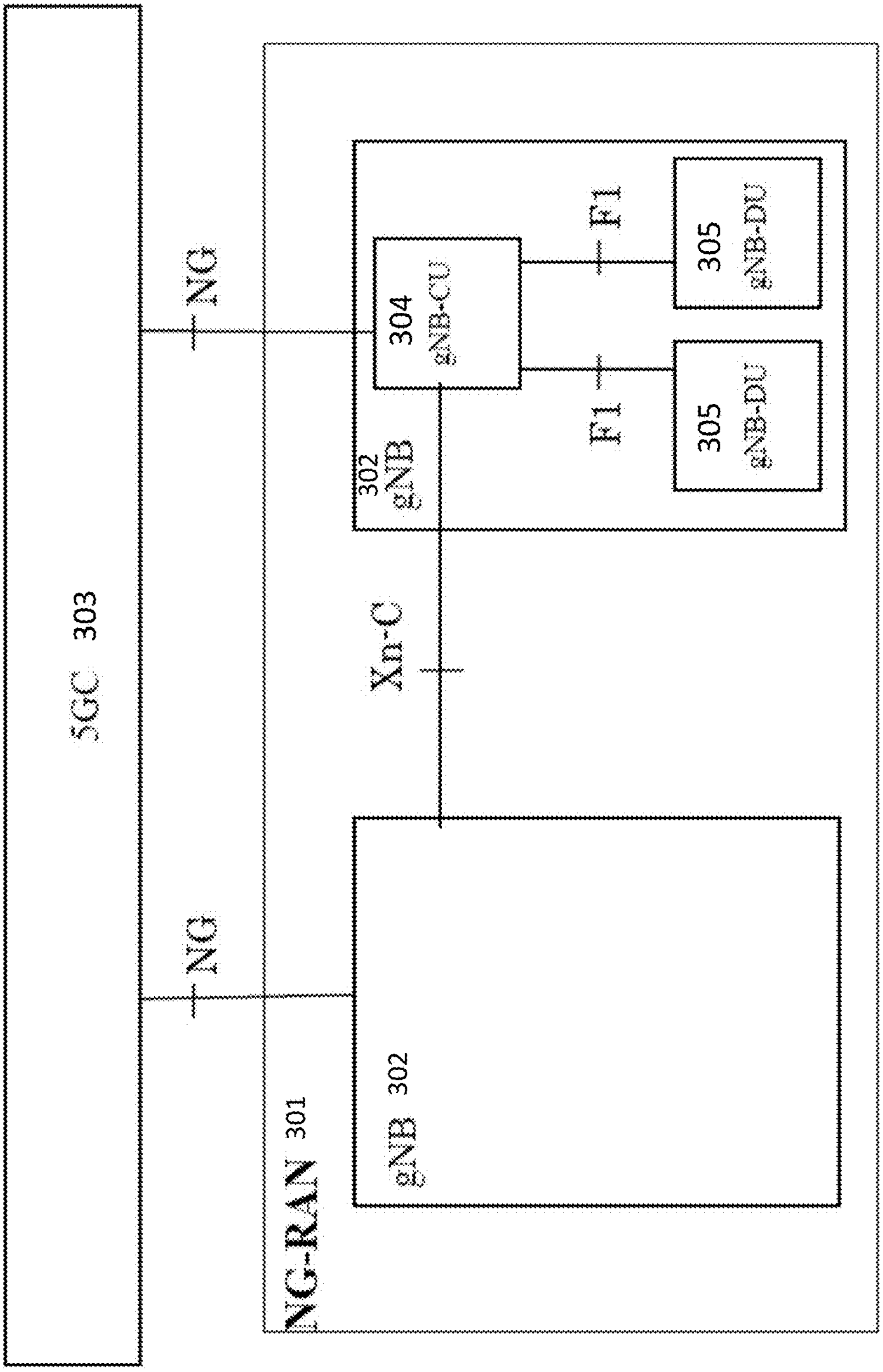
FIG. 3 is a block diagram illustrating NG-RAN architecture.
Figure 4:
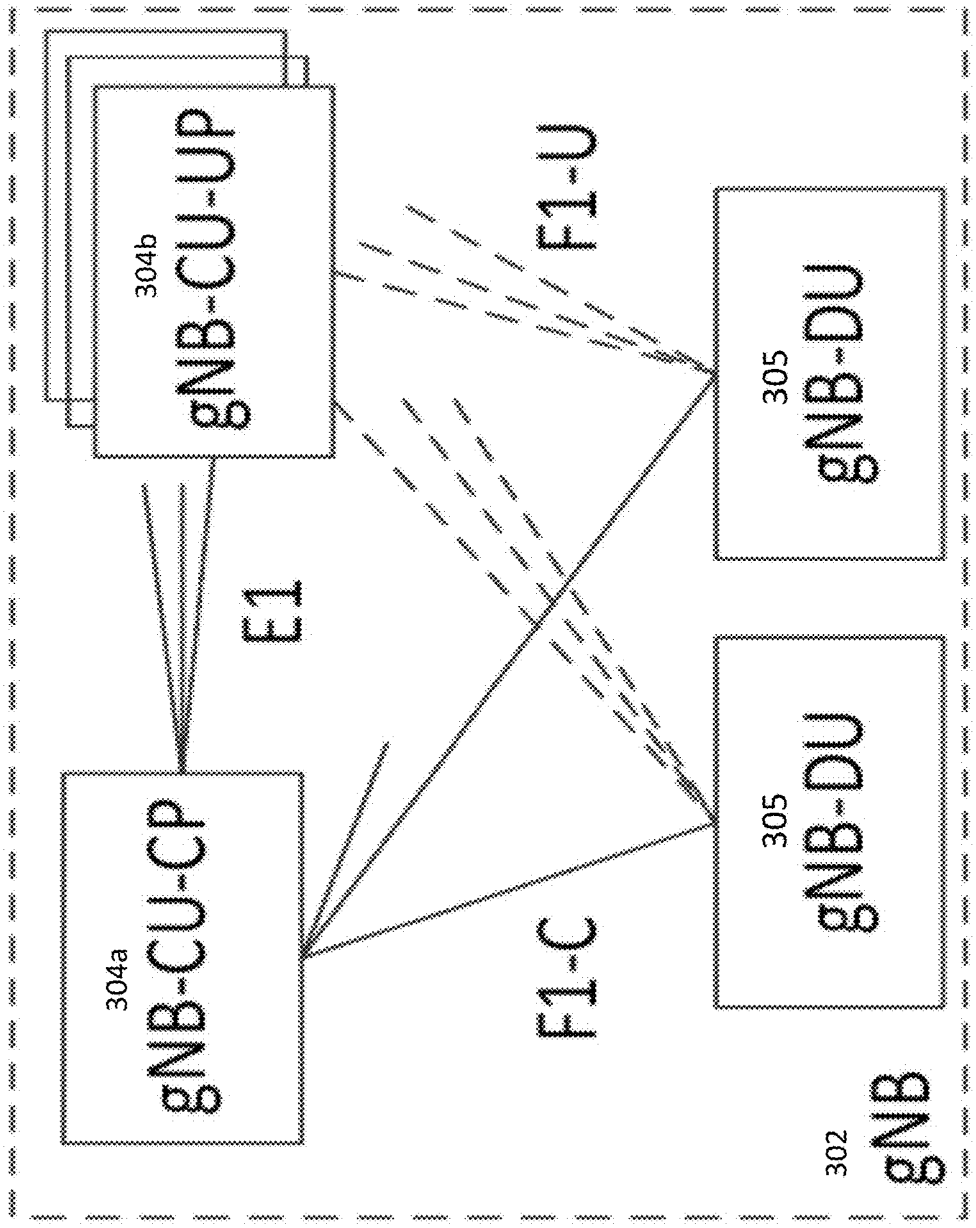
FIG. 4 is a block diagram illustrating separation of CU-CP and CU-UP in NG-RAN architecture.
Figure 5:
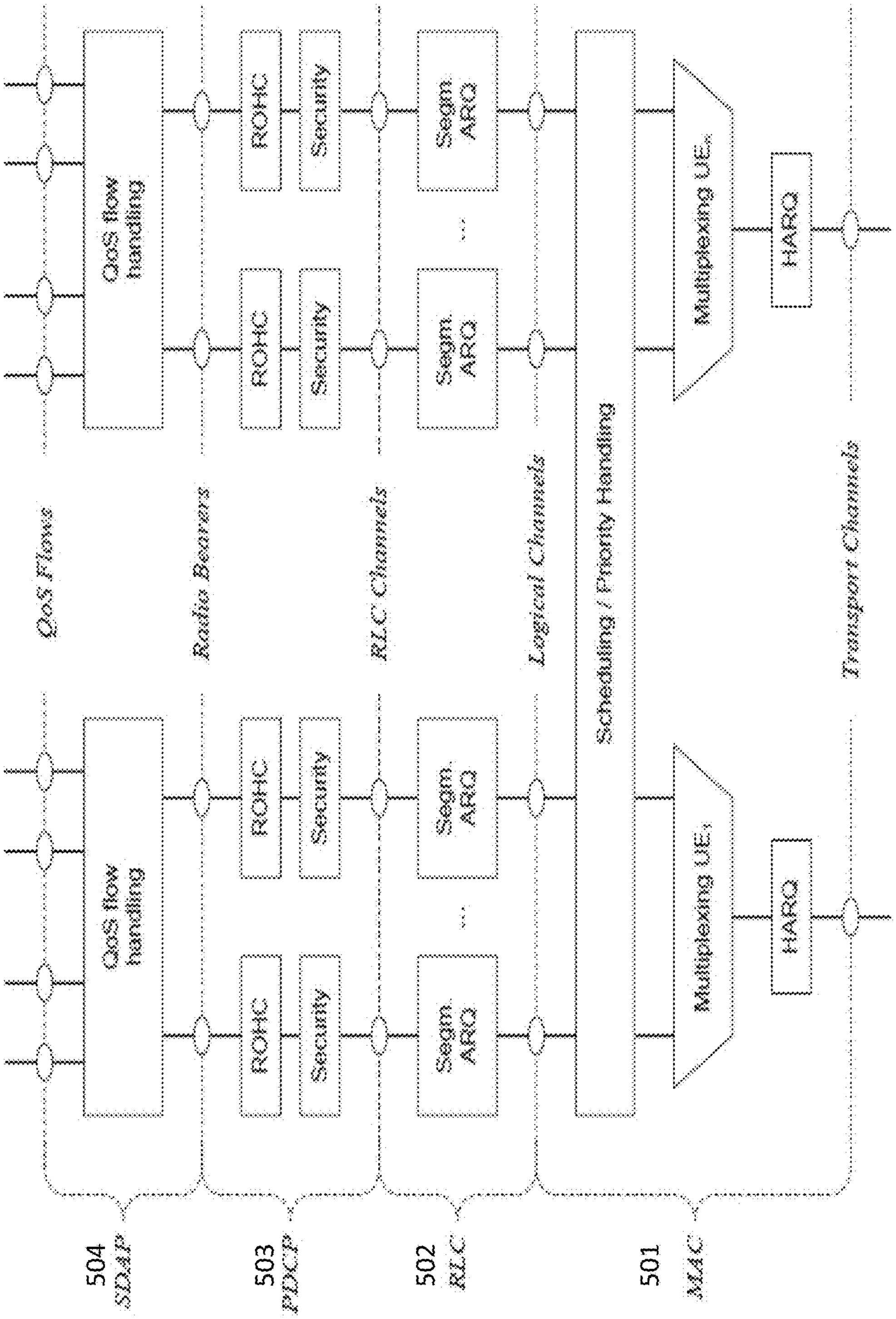
FIG. 5 is a block diagram illustrating DL L2 structure.
Figure 6:
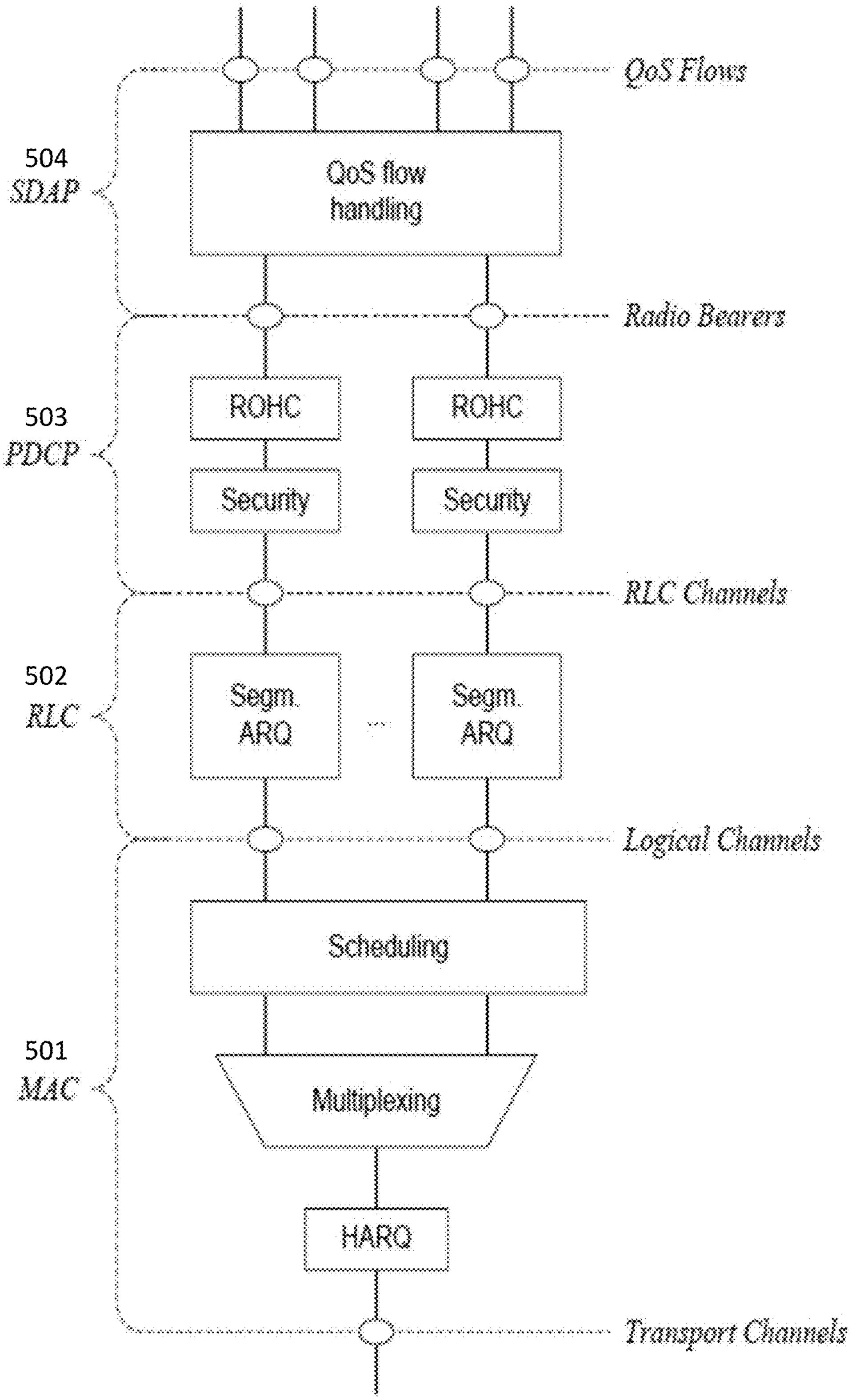
FIG. 6 is a block diagram illustrating UL L2 structure.
Figure 7:
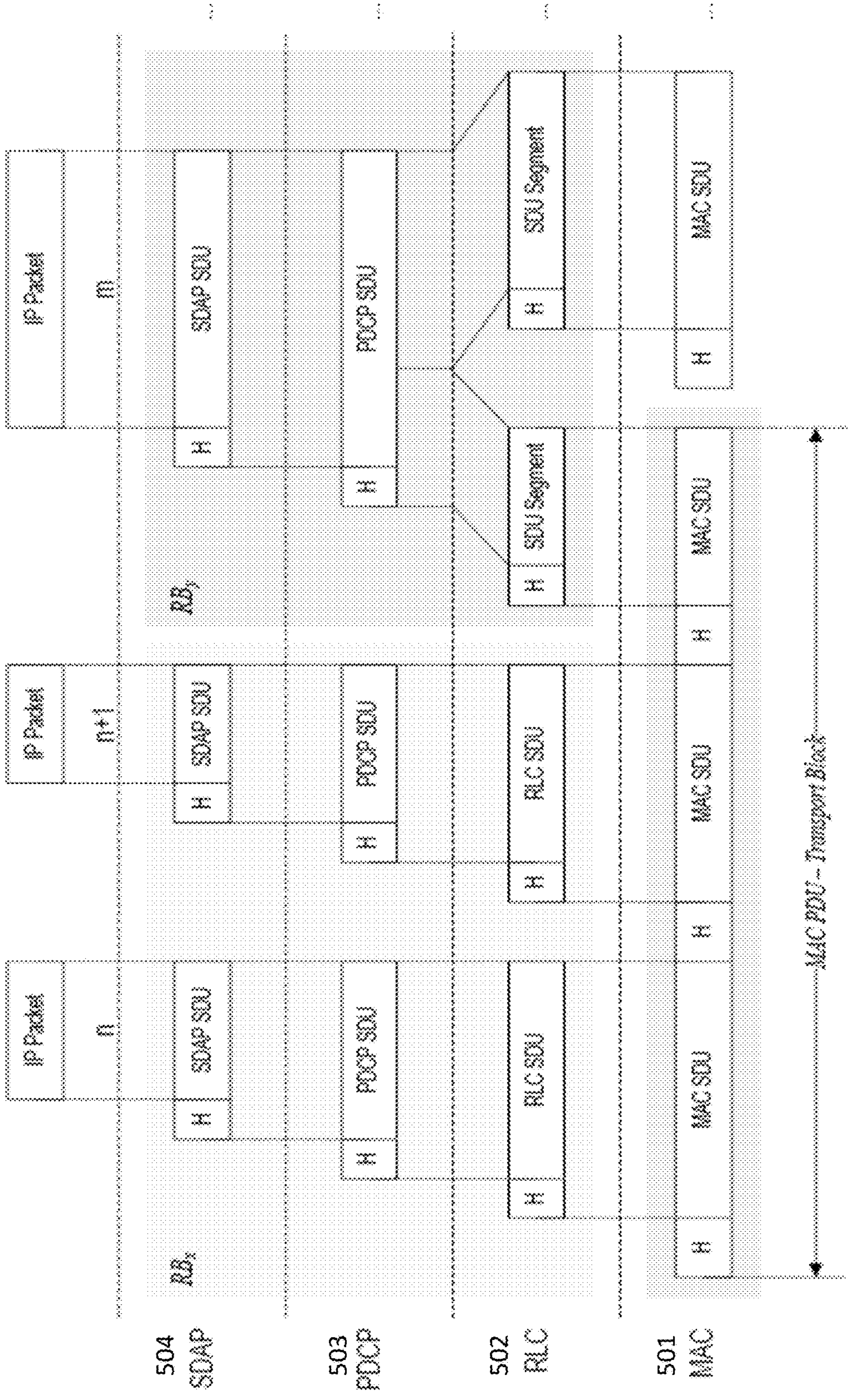
FIG. 7 is a block diagram illustrating L2 data flow example.
Figure 8:
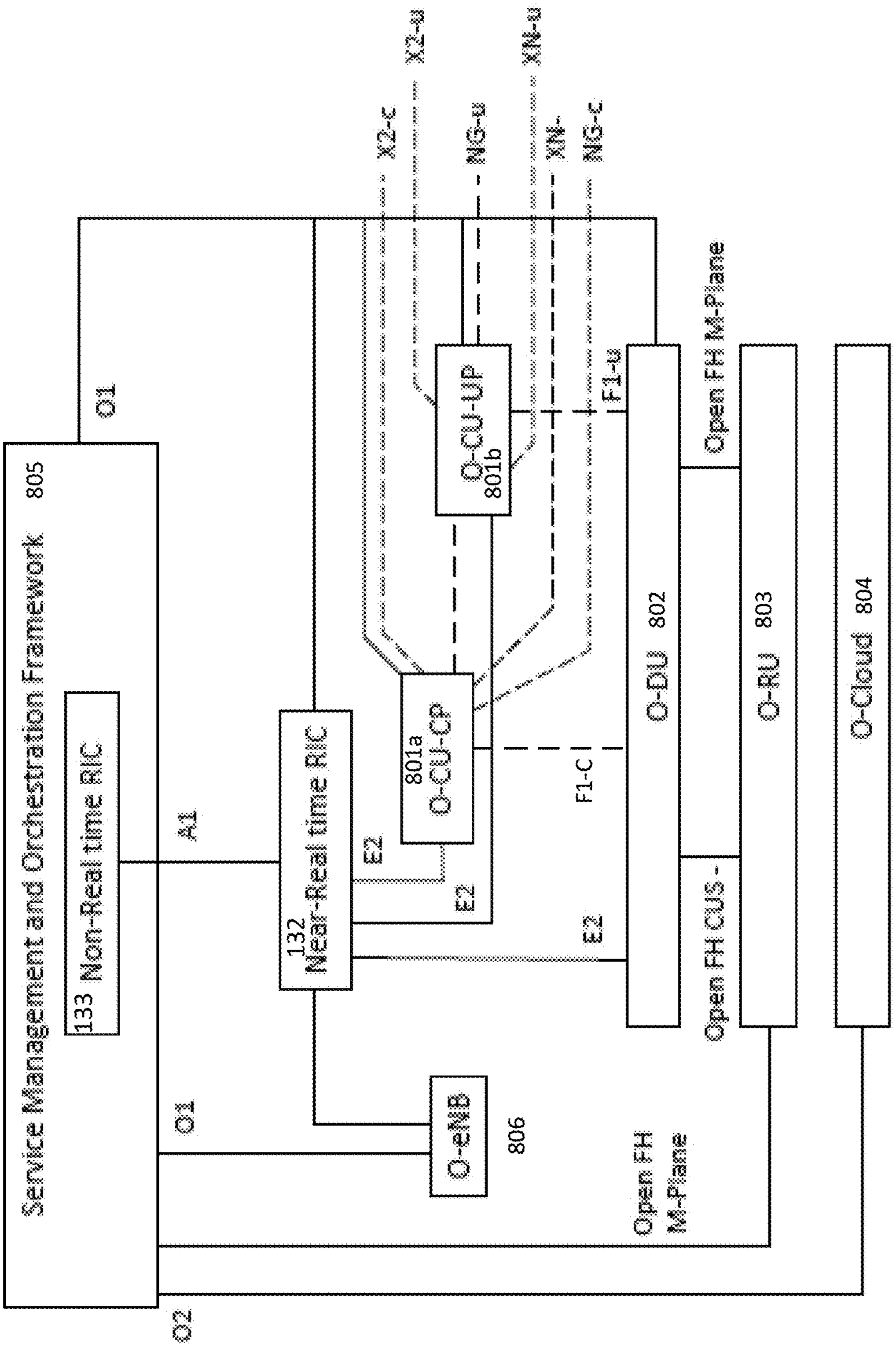
FIG. 8 illustrates an overview of O-RAN architecture.
Figure 9:
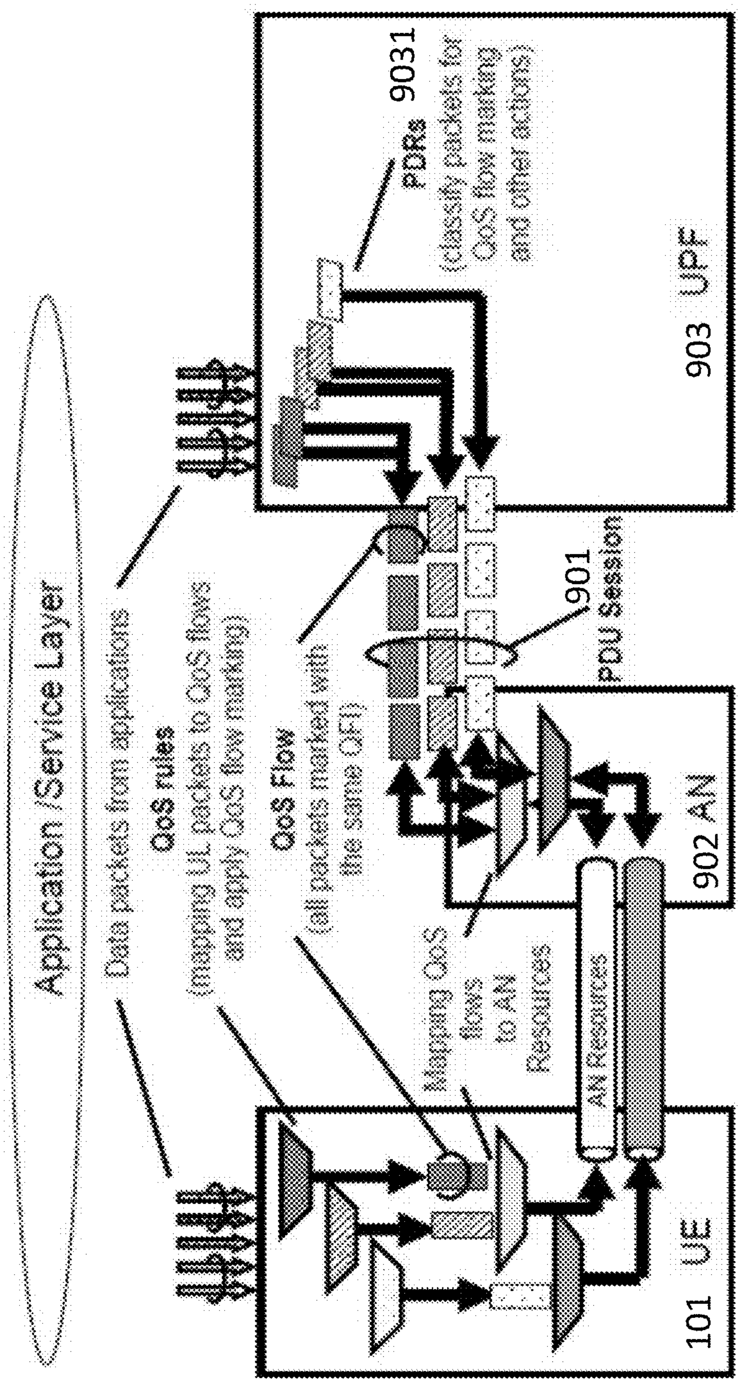
FIG. 9 is a block diagram illustrating an example PDU session consisting of multiple DRBs, each DRB consisting of one or more QoS flows.
Figure 10:
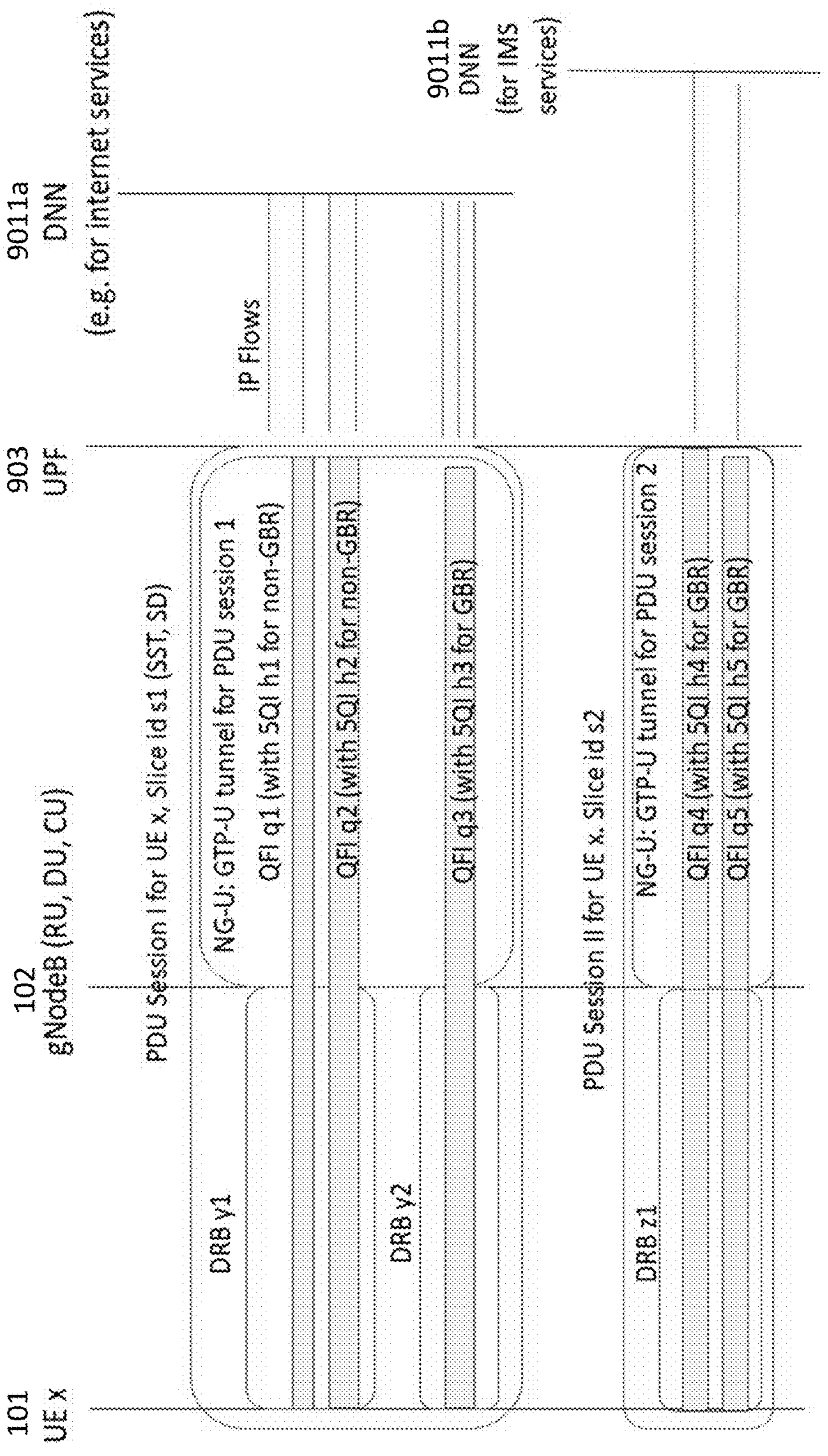
FIG. 10 illustrates 5G network architecture in the context of multiple PDU sessions involving multiple DRBs and QoS Flow Identifiers (QFIs).
Figure 11:
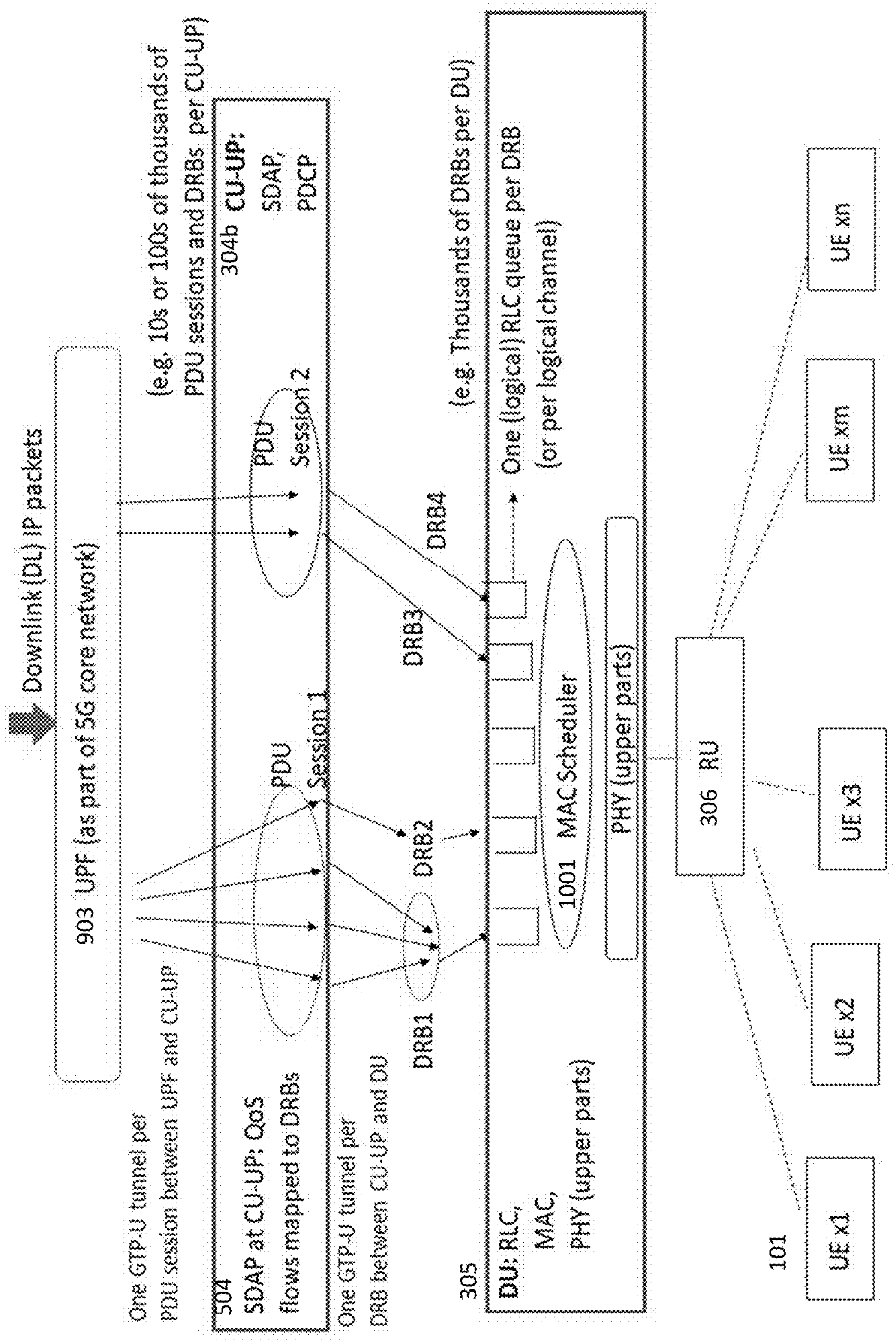
FIG. 11 illustrates 5G network architecture in the context of Radio Resource Management (RRM) with a MAC Scheduler.
Figure 12A:
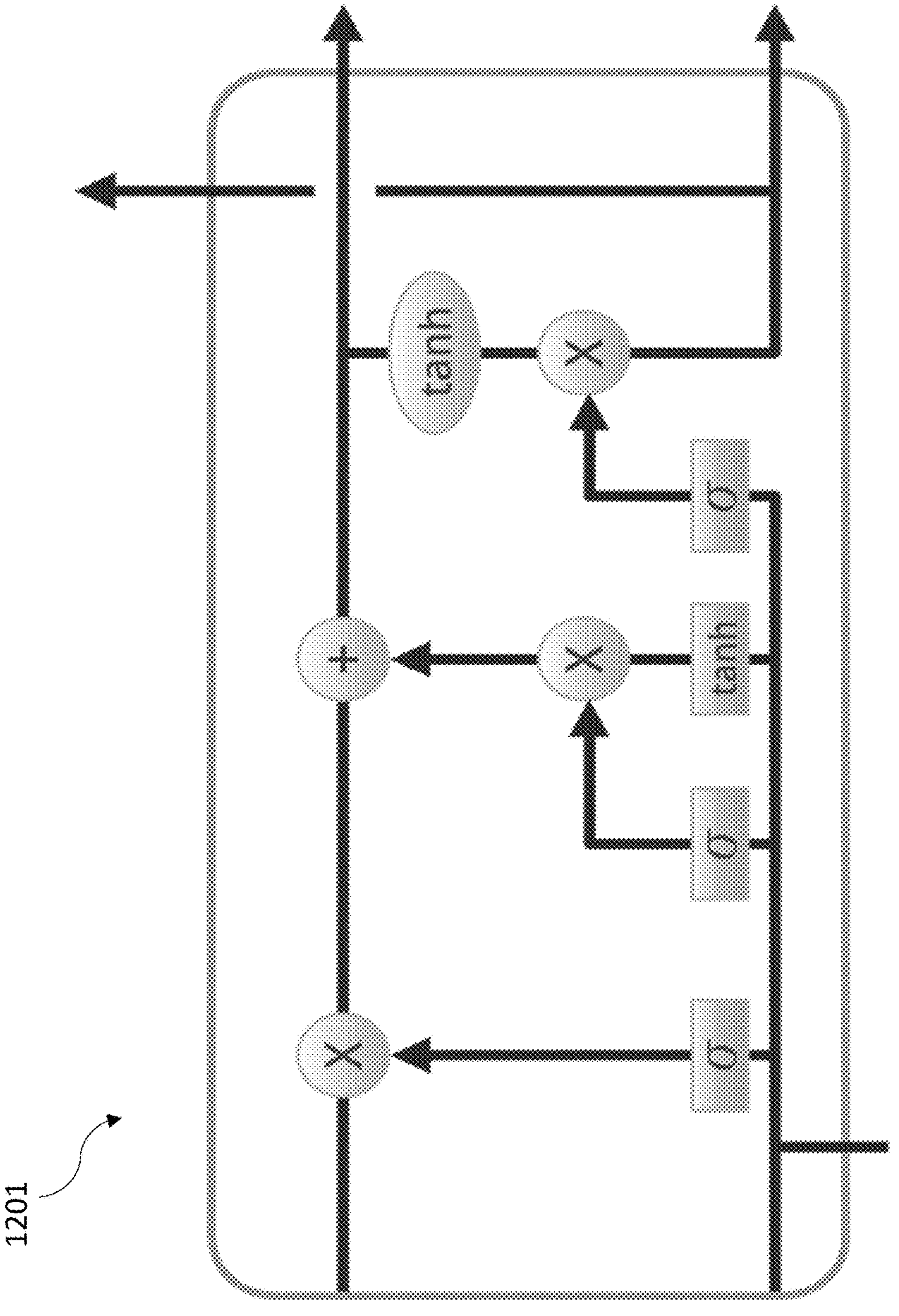
FIG. 12*a* is a signal flow diagram illustrating the overall structure of an LSTM network.

FIG. 12*a* illustrates the overall structure of an LSTM network 1201. The overall LSTM network can be represented by the following expressions:

$$f_t = \sigma(W_f \cdot (h_{t-1}, x_t) + b_f)$$

$$i_t = \sigma(W_i \cdot (h_{t-1}, x_t) + b_i)$$

$$o_t = \sigma(W_o \cdot (h_{t-1}, x_t) + b_o)$$

$$\tilde{c}_t = \tanh(W_c \cdot (h_{t-1}, x_t) + b_c)$$

$$c_t = f_t \odot c_{t-1} + i_t \odot \tilde{c}_t$$

$$h_t = o_t \odot \tanh(c_t)$$

where, $f_t$ represents the forget gate;

$i_t$ represents the input gate;

$o_t$ represents the output gate;

σ is the sigmoid activation function;

tan h: hyperbolic tangent activation function;

$h_{t-1}$: output of the previous LSTM block (at time stamp t−1);

$x_t$: input at the current time stamp;

$W_i$: weight matrix corresponding to the input gate;

$W_f$: weight matrix corresponding to the forget gate;

$W_o$: weight matrix corresponding to the output gate;

$W_c$: weight matrix corresponding to the cell state;

$b_i$: bias corresponding to the input gate;

$b_f$: bias corresponding to the forget gate;

$b_o$: bias corresponding to the output gate;

$b_c$: bias corresponding to the cell state;

$\tilde{c}_t$: represents candidate for cell state (memory) at time stamp t;

$c_t$: cell state (memory) at time stamp t;

$h_t$: output of the LSTM block (at time stamp t); and

⊙: element wise multiplication.

Figure 12C:
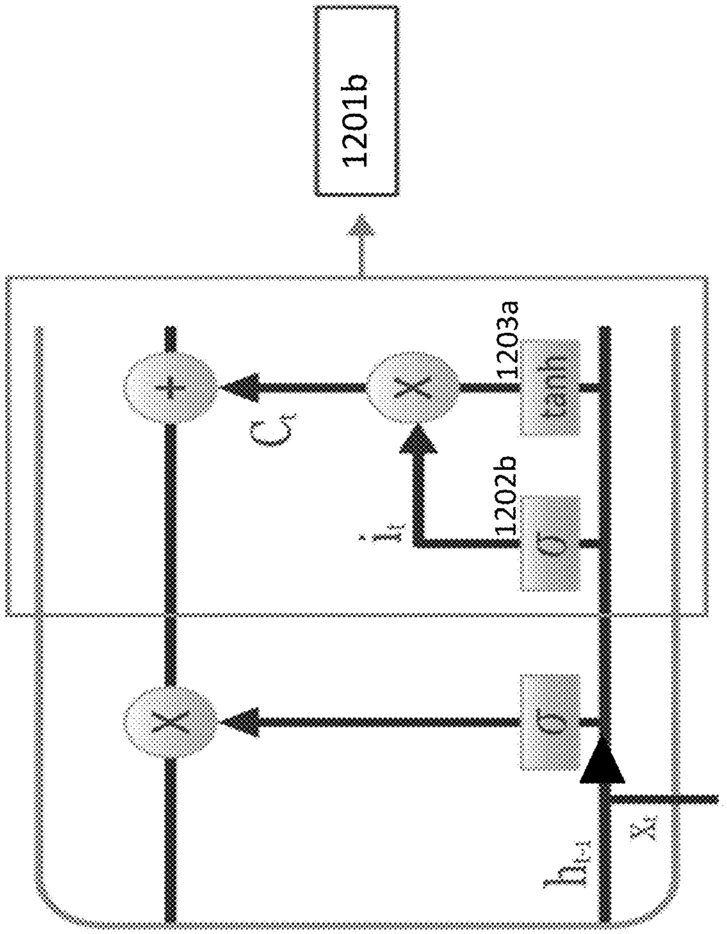
FIG. 12*c* is a signal flow diagram illustrating the input gate portion of the LSTM network.
Figure 12B:
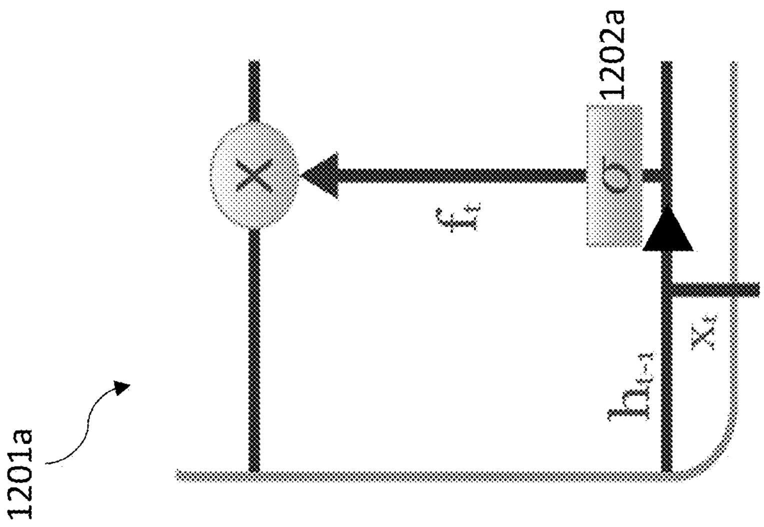
FIG. 12*b* is a signal flow diagram illustrating the forget gate portion of the LSTM network.

The information that is no longer useful in the cell state is removed with the forget gate 1201*a*, which is illustrated in FIG. 12*b*. Two inputs, $x_t$ (input at the particular time t) and $h_{t-1}$ (previous cell output from time t−1), are fed to the gate and multiplied with weight matrices followed by the addition of bias. The resultant is passed through sigmoid activation function 1202*a*, which produces a binary output. For a particular cell state, i) if the output is 0, the piece of information is forgotten, and ii) if output is 1, the information is retained for future use. As noted above in connection with FIG. 12*a*, the forget gate is represented by the expression:

$$f_t = \sigma(W_f \cdot (h_{t-1}, x_t) + b_f)$$

where.

$f_t$ represents the forget gate;

σ is the sigmoid activation function;

$W_f$: weight matrix corresponding to the forget gate;

$h_{t-1}$: output of the previous LSTM block (at time stamp t−1);

$x_t$: input at the current time stamp; and $b_f$: bias corresponding to the forget gate.

The addition of useful information to the cell state is done by the input gate 1201*b*, which is shown in FIG. 12*c*. First, the information is regulated using the sigmoid function 1202*b*, which filters the values to be remembered (similar to the forget gate 1201*a*) using inputs $h_{t-1}$ and $x_t$. Then, a vector is created using the tan h function 1203*a* that gives an output from −1 to +1, which contains all the possible values from $h_{t-1}$ and $x_t$. Lastly, the values of the vector and the filtered (regulated) values are multiplied to obtain useful information $C_t$, which represents cell state (memory) at time stamp t. The input gate and its associated functionality can be represented by the following expressions:

$$i_t = \sigma(W_i \cdot (h_{t-1}, x_t) + b_i)$$

$$\tilde{c}_t = \tanh(W_c \cdot (h_{t-1}, x_t) + b_c)$$

$$c_t = f_t \odot c_{t-1} + i_t \odot \tilde{c}_t$$

where, $i_t$ represents the input gate;

σ is the sigmoid activation function;

$W_i$: weight matrix corresponding to the input gate;

$W_c$: weight matrix corresponding to the cell state;

$h_{t-1}$: output of the previous LSTM block (at time stamp t−1);

$x_t$: input at the current time stamp;

$b_i$: bias corresponding to the input gate;

$b_c$: bias corresponding to the cell state;

$\tilde{c}_t$: represents candidate for cell state (memory) at time stamp t;

$c_t$: cell state (memory) at time stamp t; and

⊙: element-wise multiplication.

Figure 12D:
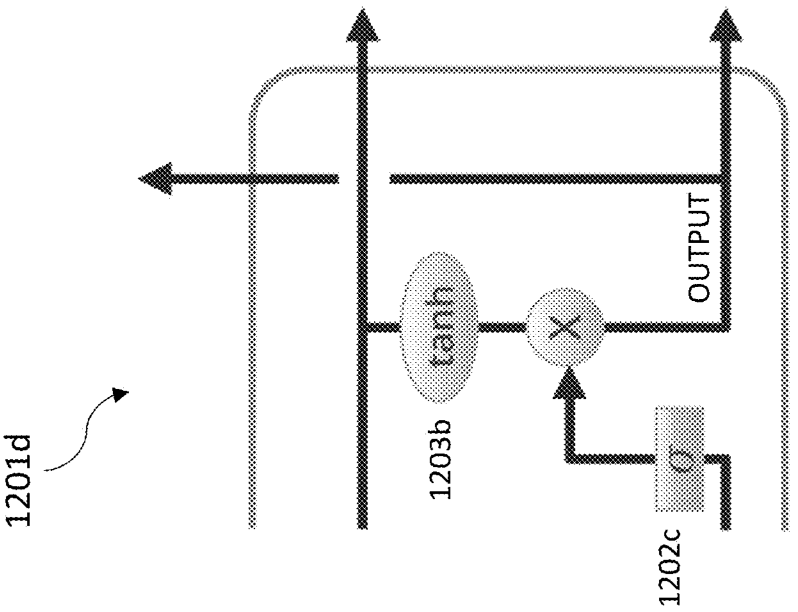
FIG. 12*d* is a signal flow diagram illustrating the output gate portion of the LSTM network.

The task of extracting useful information from the current cell state to be presented as output is done by the output gate 1201*d*, which is shown in FIG. 12*d*. First, a vector is generated by applying the tan h function 1203*b* on the cell state $C_t$ from the input gate 1201*b*. Then, the information is regulated using the sigmoid function 1202*c* and filtered for the values to be remembered using inputs $h_{t-1}$ and $x_t$. Lastly, the values of the vector and the filtered (regulated) values are multiplied to be sent as an output of this cell and input to the next cell. The output gate 1201*d* and its associated functionality can be represented by the following expressions:

$$o_t = \sigma(W_o \cdot (h_{t-1}, x_t) + b_o)$$

$$h_t = o_t \odot \tanh(c_t)$$

where, $o_t$ represents the output gate;

σ is the sigmoid activation function;

$W_o$: weight matrix corresponding to the output gate;

$h_{t-1}$: output of the previous LSTM block (at time stamp t−1);

$x_t$: input at the current time stamp;

$b_o$: bias corresponding to the output gate;

$h_t$: output of the LSTM block (at time stamp t); and

⊙: element-wise multiplication.

According to an example embodiment, a traffic analytics module can be located at an RIC (e.g., near-RT RIC) server, at a CU, or at an analytics server. The traffic analytics module utilizes LSTM for traffic predictions, and stochastic gradient descent is utilized for training the LSTM, e.g., at the traffic analytics module. Several variants of the example method of traffic prediction using LSTM in O-RAN networks will be described below.

According to an example embodiment, the traffic prediction analytics module (server) is located at the near-RT RIC. Multiple performance measurements are used for the traffic prediction at the analytics server, some of which measurements are available at the analytics module, e.g., contextual parameters information, and some measurements will be communicated to the near-RT RIC from DU over the E2 interface, for which purpose the E2 interface is enhanced. According to the present disclosure, a generic factor (Y) is considered to capture the contextual parameters, e.g., holidays (captured by an analytics software reading the calendar), weather (captured by an analytics software reading the weather report and/or forecast), time of the day (captured by a clock) etc.

Figure 13:
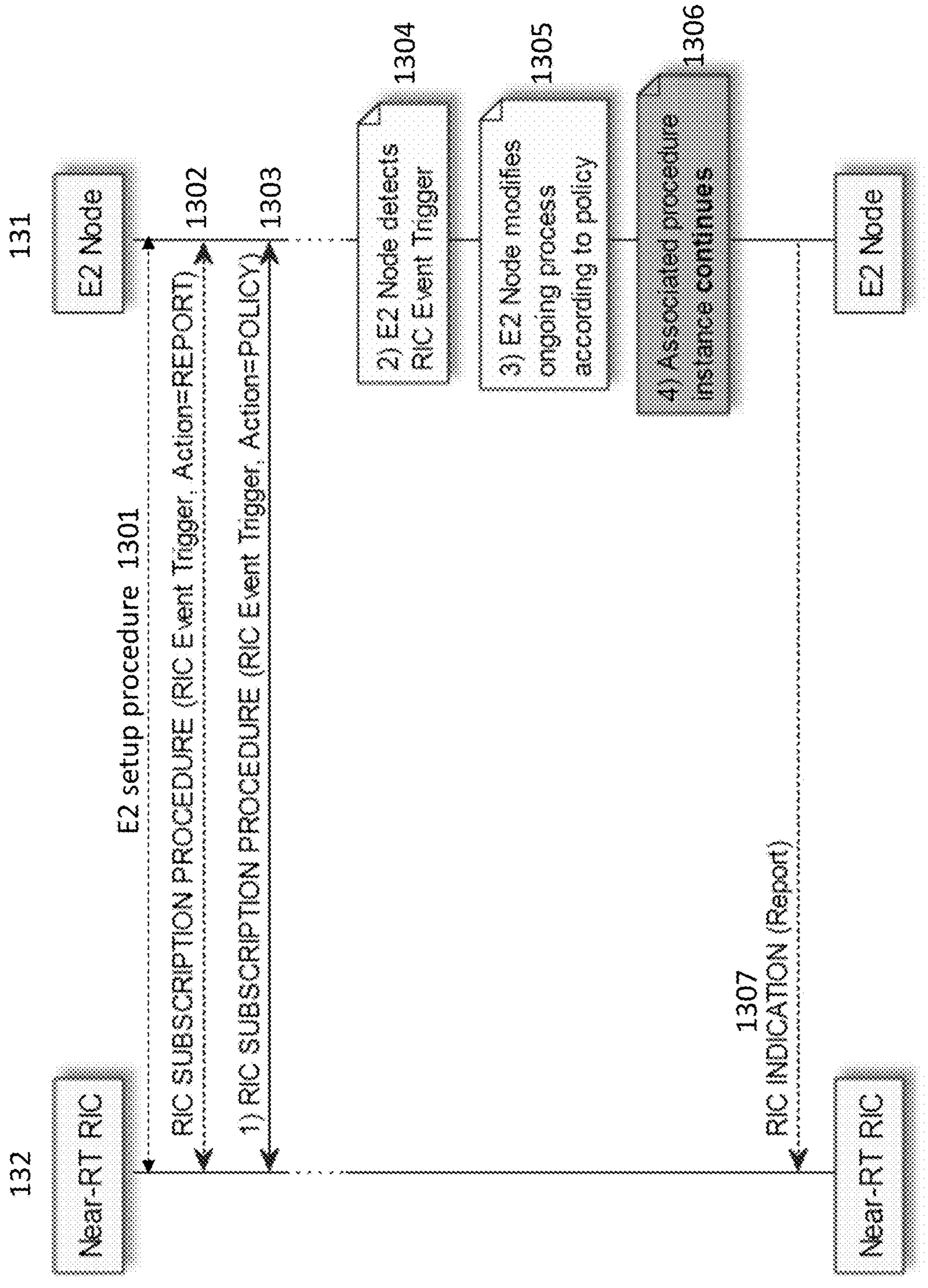
FIG. 13 is a signal flow diagram of E2AP SUBSCRIPTION procedure utilized for traffic prediction in an O-RAN system using a near-RT RIC.

As shown in FIG. 13, which is a signal flow diagram of E2AP SUBSCRIPTION procedure utilized for traffic prediction in an O-RAN system using a near-RT RIC, the example method starts with an E2 setup procedure 1301 between the E2 Node 131 (which encompasses DU and CU) and the near-RT RIC 132, which E2 setup procedure is as specified in the O-RAN and 3GPP specifications. The next step involves the RIC subscription procedure including a sequence of actions: i) Near-RT RIC requests a SUBSCRIPTION from the E2 Node 131 for REPORT, with the corresponding Event Trigger (e.g., periodic trigger), and the E2 Node 131 acknowledges the SUBSCRIPTION (generally referenced by the process arrow 1302); and ii) Near-RT RIC requests a SUBSCRIPTION from the E2 Node 131 for POLICY, with the corresponding Event Trigger (e.g., periodic trigger), and the E2 Node 131 acknowledges the SUBSCRIPTION (generally referenced by the process arrow 1303). In this manner, the Near-RT RIC subscribes to the relevant information from the E2 Node (e.g., DU) and provides the triggers for the E2 Node to communicate the subscribed information, which subscribed information from the E2 Node is used to configure a policy that is to be performed by the E2 Node (e.g., DU). In the example embodiment, the policy encompasses the set of parameters obtained from the analytics server, i.e., the updated weights, the number of hidden layers, and the number of input observed values used for prediction that need to be communicated to the E2 Node (e.g., DU), which uses it to predict the traffic in subsequent time slots.

Subsequently, the E2 Node (e.g., DU) detects the RIC event trigger (as shown in box 1304). In the case of the REPORT trigger event occurring, the REPORT service sends the subscribed information from the E2 Node 131 (e.g., DU) to the Near-RT RIC 132 in an RIC INDICATION report (as shown by the process arrow 1307). E2 Service Model Key Performance Measurements (E2SM-KPM) service supports E2 Node measurements, e.g., the subscribed information can be communicated to the Near-RT RIC 132 periodically, e.g., once in every T time slots. In the example embodiment, the Near-RT RIC 132 subscribes to the following performance measurements from the DU: a) cell load; b) mid-haul characteristics, and c) Buffer Occupancy (BO) for each DRB (for each UE) in the RLC queues at DU. Cell load is a network-related parameter, e.g., it can represent physical resource block (PRB) utilization within a given time duration. For example, if a UE is not getting a desired downlink throughput (e.g., because a cell is heavily loaded), the application running on the UE may send feedback (e.g., via TCP ACKs) to the traffic source to reduce the DL data rate. Mid-haul characteristics can include packet error rate over the mid-haul (i.e., over F1 interface which is between CU and DU), and/or latency over the mid-haul. BO for each DRB for each UE in the RLC queues at DU is discussed in detail below. Also, UE keeps giving predicted CSI (Channel State Information) to E2 node (which could be DU or CU) periodically for the next few slots. E2 node keeps communicating this to near-RT RIC.

E2SM-KPM service also supports E2 Node measurements for multiple UEs, e.g., this information can be communicated to the Near-RT RIC 132 periodically, e.g., once in every T time slots. For each UE, the Near-RT RIC 132 can subscribe to the following performance measurements from the DU: Buffer Occupancy (BO) for each DRB (with 5QI). In the example embodiment, instantaneous BO (denoted as BO_inst) or weighted average value of BO (denoted as BO_est, which is defined below) can be communicated every T time slots.

$$BO\_est = a * BO\_est + (1 - a) * BO\_inst$$

where "a" is the IIR (Infinite impulse response) filter coefficient, which is between 0 and 1. In the example embodiment, the estimate can be i) running over the entire relevant time horizon, or ii) can be reset after every T time slots, e.g., by making BO_est equal to a value (e.g., can be a fraction of the last BO_est value) after every T time slots. If BO_est is reset after every T time slots to zero (i.e., reset to zero percent of the last BO_est value), the latest estimated BO represents an estimated BO of recent T time slots.

As shown in FIG. 13, when the E2 Node 131 (e.g., DU) detects an RIC trigger event 1304 (e.g., for RIC Indication Report), DU uses LSTM in a feed forward manner with the policy obtained at a previous trigger event (which is assumed to have occurred in this example illustration) to predict the DL traffic for a DRB. As shown at 1305, the E2 Node (DU) modifies the ongoing process of traffic prediction according to the information contained in the latest policy (i.e., the updated weights, the number of hidden layers (n), and the number of input observed values used for prediction (k)). As shown at 1306, associated procedure instance continues at the E2 Node 131 (i.e., DU continues to run radio resource management methods) with the latest policy. The E2 Node 131 (e.g., DU) then sends the performance measurements, e.g., buffer occupancy (BO) for each DRB at 5QI level (for each UE), cell load, and mid-haul characteristics of the O-RAN to the Near-RT RIC 132 in an RIC indication (Report) message 1307, for which purpose the E2 interface is enhanced.

Figure 14:
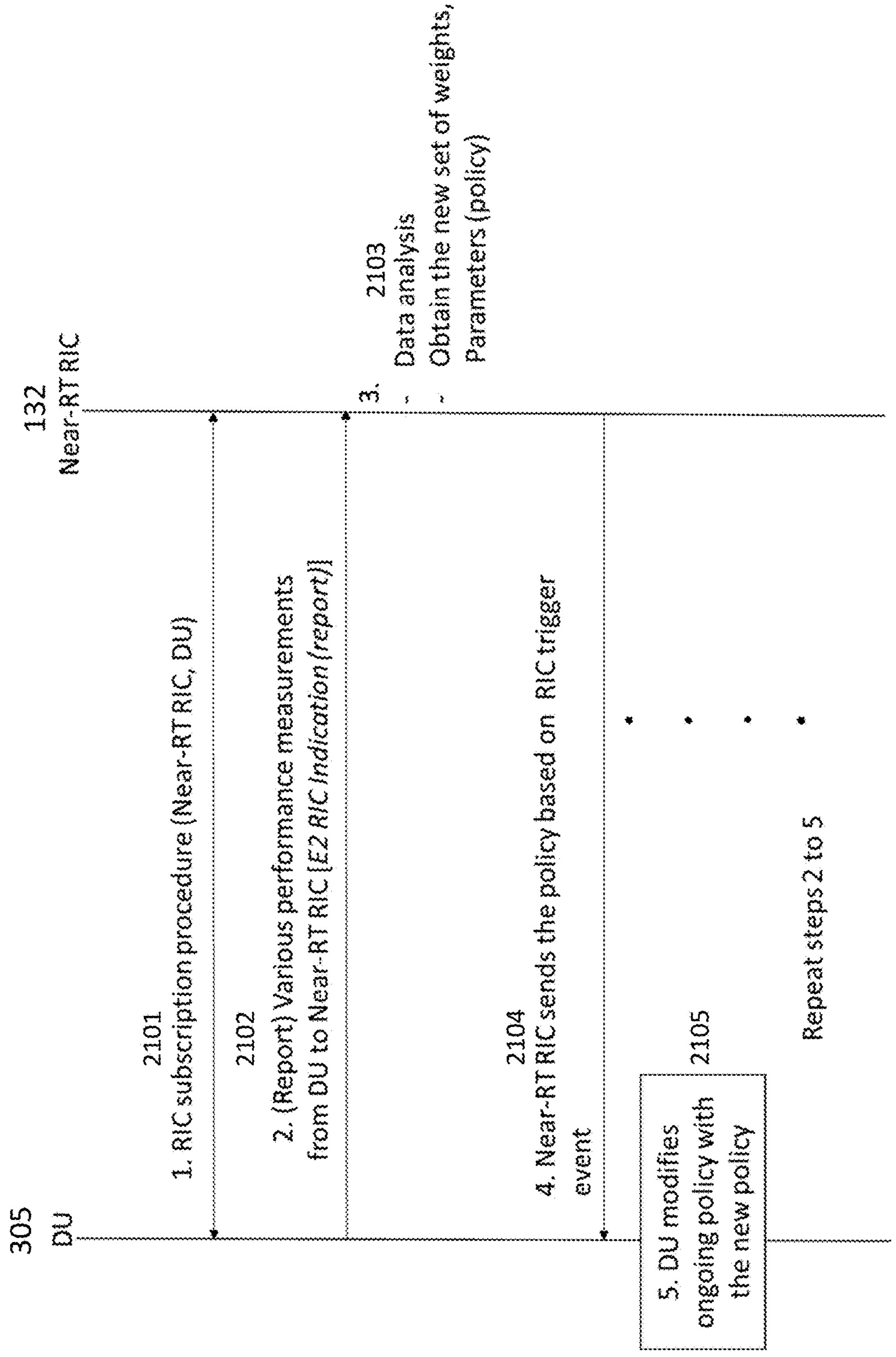
FIG. 14 is a signal flow diagram of an example embodiment of a method for traffic prediction analytics at a near-RT RIC.

FIG. 14 illustrates the overall traffic prediction analytics at the Near-RT RIC 132 and the interaction of the Near-RT RIC 132 and the DU 305 (which is part of the E2 Node 131 shown in FIG. 13). The overall illustrated sequence includes the following:

Step 1: Near-RT RIC 132 configures an RIC Subscription in the DU 305 with information used to configure a policy that is to be performed by the DU with each occurrence of trigger event. This configuration of RIC Subscription Procedure is illustrated by the process arrow 2101 in FIG. 14. E2SM-KPM service supports E2 Node measurements for multiple UEs, as mentioned above.

Step 2: Once a trigger event is detected (e.g., RIC Indication (Report) event trigger), DU sends various performance measurements to the Near-RT RIC 132 in RIC Indication (Report) message (as referenced by the process arrow 2102 in FIG. 14).

Step 3: Based on the received performance measurement, the Near-RT RIC performs data analysis and traffic predictions to derive a new policy comprising a new set of parameters (e.g., updated weights, the number of hidden layers, and the number of input observed values used for prediction), as referenced by 2103 in FIG. 14.

Step 4: Once an RIC trigger event is detected (e.g., POLICY event trigger), the Near-RT RIC 132 sends the latest updated policy to the DU 305, as referenced by the process arrow 2104 in FIG. 14).

Step 5: DU 305 modifies the ongoing policy with the new policy received from the Near-RT RIC 132, as referenced by the block 2105 in FIG. 14).

Steps 2-5 can be repeated to serve the ongoing network traffic.

Figure 15:
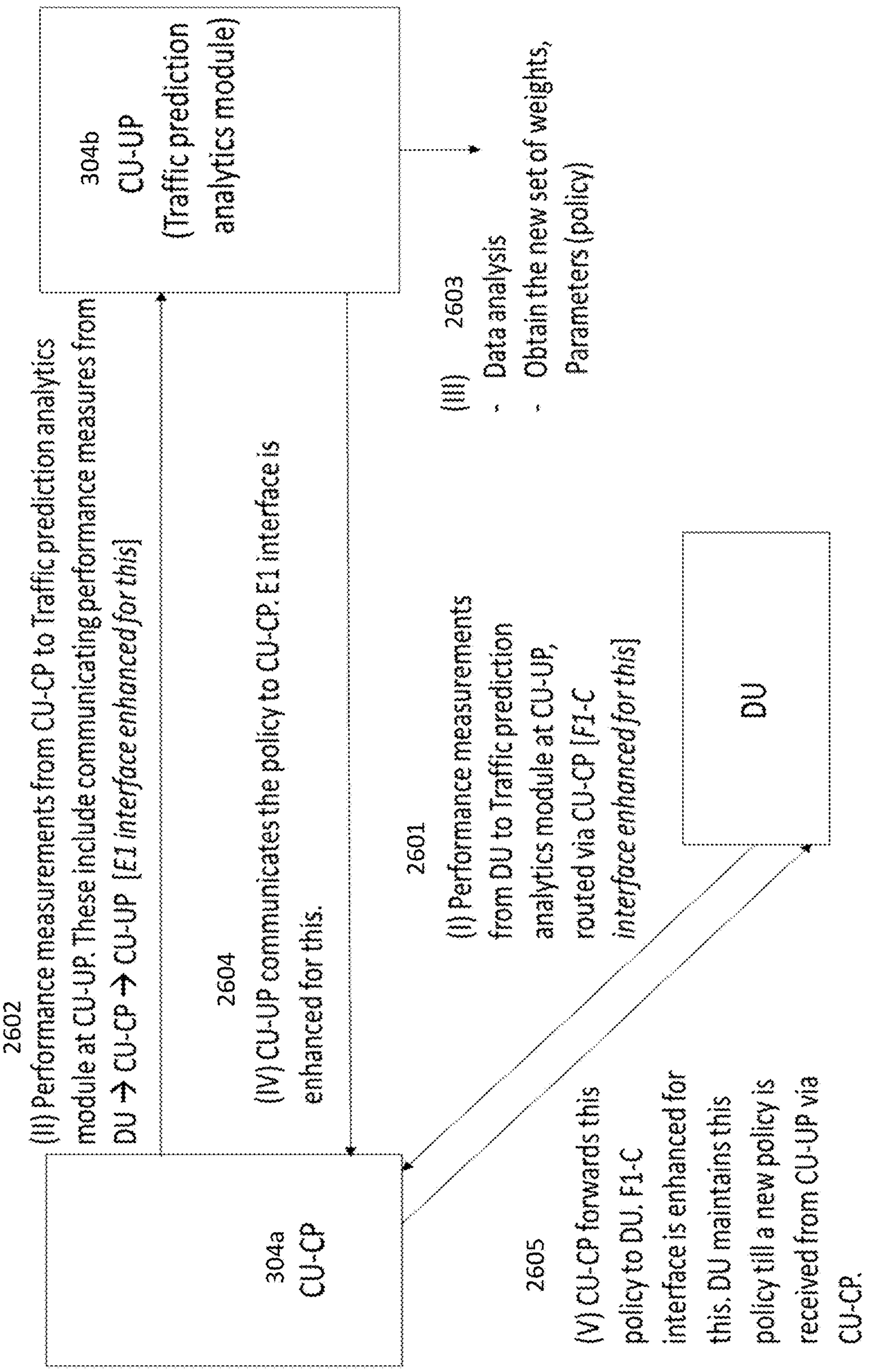
FIG. 15 is a signal flow diagram illustrating the steps of an example method for downlink traffic prediction and RRM policy derivation.

According to an example embodiment, the traffic prediction analytics module can be located at a CU-UP, e.g., for performing downlink traffic prediction (for each DRB). Contextual parameters (Y) (as described in connection with the previous example embodiment utilizing Near-RT RIC for the traffic prediction analytics module), can be made available at CU-UP, for which purpose F1-C (the interface between DU and CU-CP) and E1 (the interface between CU-CP and CU-UP) are enhanced. FIG. 15 illustrates the overall traffic prediction analytics steps (I)-(V) described below.

Step (I): The DU communicates the following performance measurements to the traffic prediction analytics module at the CU-CP: Buffer Occupancy (BO) for each DRB at 5QI level; cell load; and mid-haul characteristics of O-RAN. At the DU, communication of the performance measurements can be done periodically or based on specified events. F1-C interface between DU and CU-CP is enhanced for this purpose. In the example embodiment, instantaneous BO (denoted as BO_inst) or weighted average value of BO (denoted as BO_est, which is defined below) can be communicated every T time slots.

$$BO\_est = a * BO\_est + (1 - a) * BO\_inst$$

where "a" is the HR (Infinite impulse response) filter coefficient, which is between 0 and 1. In the example embodiment, the estimate can be i) running over the entire relevant time horizon, or ii) can be reset after every T time slots, e.g., by making BO_est equal to a value (e.g., can be a fraction of the last BO_est value) after every T time slots. Step (I) is referenced by 2601 in FIG. 15. In addition, UE keeps predicting CSI and communicates that to the DU or directly to the CU-CP. In the case the UE communicates predicted CSI to the DU, the DU in turn communicates this to the CU-CP, and F1 interface between the DU and the CU is enhanced for this purpose.

Step (II): CU-CP communicates the above performance measurements received from DU to the traffic prediction analytics module at the CU-UP. E1 interface between CU-CP and CU-UP is enhanced for this purpose. Step (II) is referenced by 2602 in FIG. 15.

Step (III): Traffic prediction analytics module at CU-UP analyzes the performance measures received from DU (via CU-CP, i.e., DU to CU-CP to CU-UP, with enhanced F1-C for DU to CU-CP, and enhanced E1 for CU-CP to CU-UP), and derives a new set of parameters defining a new policy, e.g., using one of the techniques discussed below in the section discussing traffic prediction using LSTM. Step (III) is referenced by 2603 in FIG. 15.

Step (IV): CU-UP communicates the new set of parameters defining the new policy to CU-CP. E1 interface is enhanced for this purpose. Step (IV) is referenced by 2604 in FIG. 15.

Step (V): CU-CP forwards the new set of parameters defining the new policy to DU. F1-C interface is enhanced for this purpose. DU maintains this policy until a new policy is received from CU-UP via CU-CP. Step (V) is referenced by 2605 in FIG. 15.

In this section, example embodiments of traffic prediction of each DRB (or a set of DRBs) using LSTM are discussed in detail. Some of the variants of the method for traffic prediction include the following:

Option 1: LSTM ML model is used for all the DRBs (and ML models for the DRBs are downloaded to DU) if sufficient computing and communication resources are available for this purpose.

Option 2: LSTM model is used for DRBs which are carrying traffic for high data rate, low latency applications (and ML models for these DRBs are downloaded to DU). In this case, the traffic prediction is carried out only for the DRBs that are carrying traffic from high data rate, low latency applications (such as AR/VR applications). This variant can be used if there is insufficient computing and communication resources to run and transfer ML models for all the DRBs in the base station.

Option 3: LSTM Models for all the DRBs corresponding to the same 5Qis need not be downloaded. For example, all the DRBs corresponding to 5QI8 (buffered video streaming) in a cell may map to a small number of ML models, because the number of popular video codecs is finite and the impact of mid-haul (such as packet error rate (PER), Latency, etc.) is also getting captured in the ML models. Therefore, for a given 5QI8 DRB, first few packets can be monitored to derive certain characteristics (such as packet length, time interval between consecutive packets, burst length, etc.) and pick up a suitable ML model from the already downloaded ML models for 5QI8.

Figure 16:
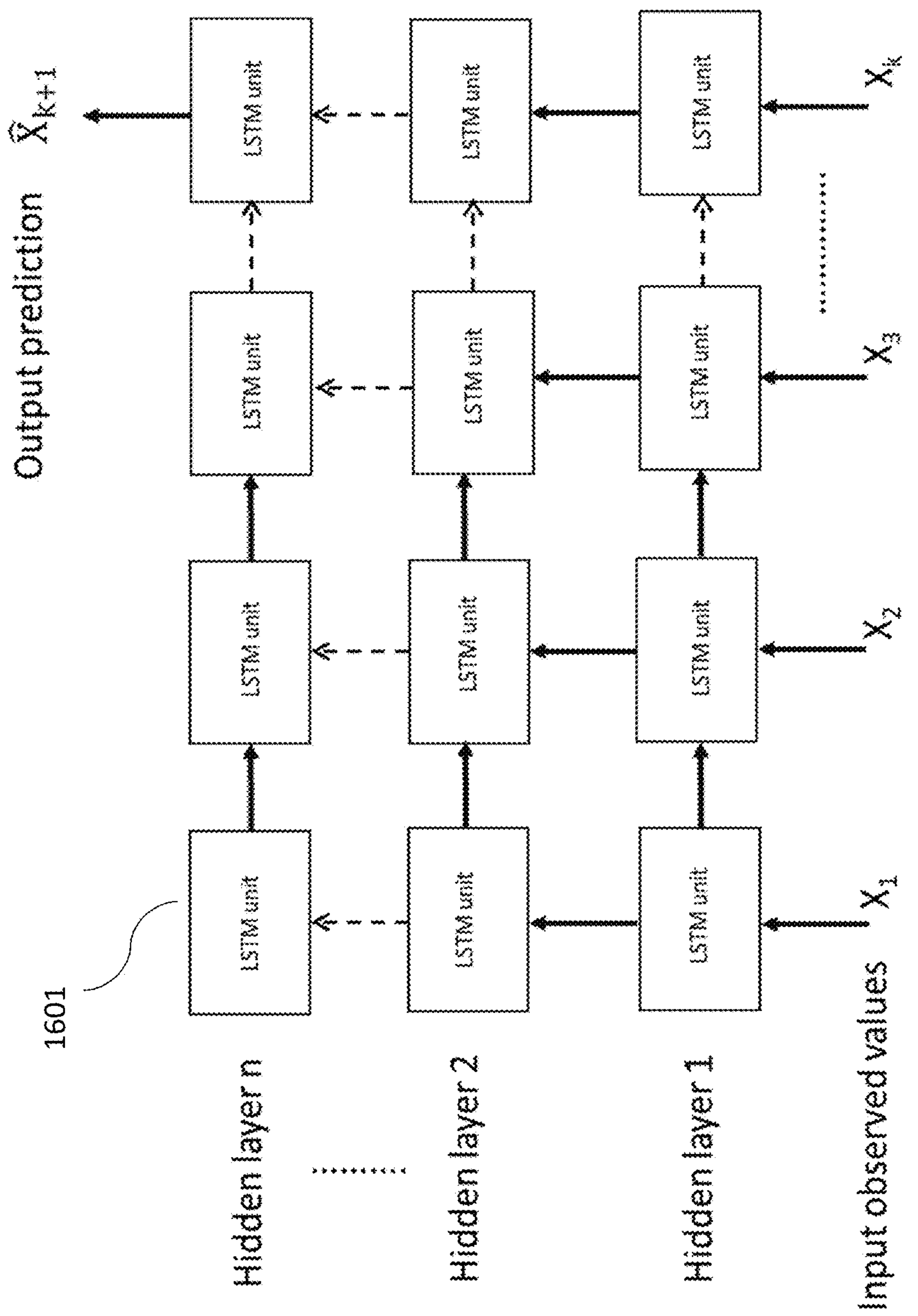
FIG. 16 is a block diagram illustrating LSTM many-to-one architecture for making a one-step traffic prediction.

According to an example embodiment, an LSTM network is formed by concatenating multiple LSTM units as shown in FIG. 16, which illustrates a many-to-one LSTM architecture for traffic prediction. Each LSTM unit 1601 consists of four layers that interact with one another in a way to produce the output of that cell, along with the cell state, on one time index, and transfers the output to the next LSTM unit. The number of concatenated units indicates the number of observations of the data that are considered before making the prediction. Using LSTM, we can make a one-step prediction or a multi-step prediction. For the one-step prediction, the many-to-one architecture shown in FIG. 16 can be used. In the example shown in FIG. 16, the LSTM network observes the input traffic for a fixed number of previous time slots and predicts the traffic for the current time slot. In FIG. 16, input observed values $X_1$. $X_2$, . . . $X_k$ at time slots 1, 2 . . . , k, respectively, are used to predict the output value at k+1, which is $\hat{X}_{k+1}$, where k is a configurable parameter. In this example, the number of hidden layers as n, which is another configuration parameter. As discussed earlier, each input observed value ($X_i$) is a function of the following parameters: Buffer Occupancy (BO) for each DRB, which can be instantaneous BO (BO_inst) or estimated BO (BO_est); cell load; and mid-haul characteristics of O-RAN (packet error rate, latency).

In the training phase for training the neural network, stochastic gradient descent is used to train the LSTM network. The 'm' training examples considered are ($\overline{X}_i$, $Y_i$), for i=k to k+m, where $\overline{X}_i$ is a vector of inputs $X_{i+1-k}$, $X_{i+2-k}$, . . . . $X_i$; $Y_i$ is the actual observed output defined as $Y_i=X_{i+1}$. We consider the least squares error cost function, which is the sum of squared error difference between the actual value and the predicted value, as shown in the equation below. The least squares error is a convex function, which attains a unique global minimum. In the equation below, θ represents the set of parameters (or weights) of the LSTM network:

$$L(\theta)=\sum_{i=k}^{k+m}\left(Y_i-\hat{X}_{i+1}\right)^2=\sum_{i=k}^{k+m}\left(Y_i-LSTM\left(\overline{X}_i,\theta\right)\right)^2$$

An example Stochastic Gradient Descent method for training the LSTM network can involve the following:

Inputs: LSTM($X_i$, θ), Training examples: $\overline{X}_k$, $\overline{X}_{k+1}$, ... , $\overline{X}_{k+m}$ ; outputs: $Y_k$, $Y_{k+1}$, ... , $Y_{k+m}$ and Loss function L.
Randomly initialize θ
do until stopping criterion
  Pick a training example { $\overline{X}_i$, $Y_i$ }
  Compute the loss L.
  Compute gradient of L, i.e., $\nabla_\theta$ L with respect to θ
  Weight update rule: θ ← θ − η$\nabla_\theta$ L, where η is learning rate.
  done
Return θ.

The stopping criteria can be based on the following: i) the number of iterations, and ii) the absolute difference in loss function between two successive iterations falls below a small positive value (i.e., repeat until convergence). Back propagation algorithm is used to compute the gradients, which are in turn resulting in updating and/or learning of the weights. Chain rule of differentiation is the key step in back propagation algorithm to compute the gradients. The learning part of this happens at the traffic prediction analytic module server. The learning will be going on at the traffic prediction analytic module server, and the updated weights (θ) are sent to the DU periodically, or based on certain trigger events. Along with the updated weights, the configuration parameters (e.g., the number of hidden layers (n) and the number of input observed values used for prediction (k)) are communicated to the DU. The updated weights and other configuration parameters are used at the DU in a feed forward manner for traffic prediction on the new samples until a new set of parameters for a new policy are sent from the traffic prediction analytics module server.

For the multi-step prediction, two variants of the example method are presented herein. In the first variant of method, during the training phase the previous predictions are fed to the network as inputs to predict the future predictions. In this case, $X_1$, $X_2$, . . . $X_k$ are used to predict the output value at k+1, which is $\hat{X}_{k+1}$. This $\hat{X}_{k+1}$ is fed to the network, along with $X_2$, . . . $X_k$, to predict the out value at k+2, $\hat{X}_{k+2}$, and so on until d output steps are predicted. In addition, the least squares error cost function is also considered, which is the sum of squared error difference between the actual value and the predicted value. To train the LSTM network, we use the stochastic gradient descent as described above to learn the weights.

In the second variant of the method, the time series of the next d output steps is predicted using the first k input steps in parallel. During the training phase, we do d-step prediction of outputs $\hat{X}_{k+1}$, $\hat{X}_{k+2}$, . . . $\hat{X}_{k+d}$ in a one-shot manner using the input observed sequence of values $X_1$, $X_2$, . . . $X_k$. The optimization function, minimizing least squares error cost function, and the learning method for obtaining updated weights, are substantially similar to the one step prediction method.

In this section, implementation of enhanced RRM policies based on predicted traffic will be discussed. As described previously, L2 methods (e.g., using a MAC scheduler) play a critical role in allocating radio resources to different UEs in a cellular network. In the present disclosure, the RRM method presented above for high data rate, low latency applications (e.g., AR, VR and/or XR) and other applications in O-RAN networks are enhanced using: 1) the predicted traffic measures proposed in the previous section; and 2) the predicted Channel State Information (CSI), which can be predicted by UE (e.g., using existing methods) and communicated to the DU.

In the case of several applications (particularly high data rate, low latency applications), the DU can suddenly get a big burst of data in a small interval of time. In the case of unreliable mid-haul in O-RAN networks (and taking into consideration retransmissions between the CU-UP and the DU), downlink data arriving at the DU can become even more bursty in some scenarios. In a medium-loaded or highly-loaded cell, it can become very challenging for the DU to serve big bursts of data properly, as well as potentially degrading the performance of other users as well.

A variety of policies and improved performance of RRM methods can be achieved by predicting and providing information about values of selected network parameters for a future time interval. According to the present disclosure, per-DRB (or per-LC) traffic for each LC is predicted and used (along with the predicted CSI provided by the UE) to optimize different types of radio resource allocation policies. The mobile data traffic prediction models provides insight regarding the expected traffic variations in time for the network operator, which insight is used to improve efficiency of radio resource allocation methods and the user experience. In the following sections, several variants of the example method for radio resource allocation are provided.

Variant 1 of the method: The scheduling priority of a logical channel ($P_{LC}$) is determined as part of MAC scheduler using one of the following:

$$P_{LC}=W_{5QI}*P_{5QI}+W_{GBR}*P_{GBR}+W_{PDB}*P_{PDB}+W_{PF}*P_{PF}, \text{ or}$$

$$P_{LC}=(W_{5QI}*P_{5QI}+W_{PF}*P_{PF})*\text{maximum}(W_{GBR}*P_{GBR},\ W_{PDB}*P_{PDB})$$

$P_{PF}$ is the priority metric corresponding to proportional fair metric of the UE. $P_{PF}$ is the classical PF metric, calculated on a per UE basis as $P_{PF}$=r/$R_{avg}$ where r: UE spectral efficiency calculated based on one RB & its last reported CQI; and $R_{avg}$=a·$R_{avg}$+(1−a)·b, UE's average throughput, where b>=0 is #bits scheduled in current TTI and 0<a<=1 is the HR filter coefficient.

In the example embodiment of Variant 1, normalized predicted BO for a DRB (LC) and a UE is utilized. We define "Normalized Predicted BO for a DRB (or its associated logical channel)" as follows: For a particular DRB (or its associated LC j) which is carrying traffic corresponding to 5QI z for the $UE_i$, we define the normalized predicted BO (for LC j) to be predicted BO for that particular LC j divided by the average packet size for the 5QI z. We then enhance the PF metric, $P_{PF}$, using the normalized predicted BO of an LC as follows:

i) We define $P_{PF\_Normalized\_Predicted\_BO\_LC}$ to be the priority metric with inclusion of normalized predicted BO of the LC to the existing proportional fair metric of the UE.

ii) $P_{PF\_Normalized\_Predicted\_BO\_LC}$ is calculated on a per LC basis as $P_{PF\_Normalized\_Predicted\_BO\_LC}$=(normalized predicted BO for that LC)*($r/R_{avg}$).

The corresponding scheduling priority of a logical channel ($P_{LC}$) is determined as part of MAC scheduler as follows:

$$P_{LC} = W_{5QI} * P_{5QI} + W_{GBR} * P_{GBR} + W_{PDB} * P_{PDB} + W_{PF\_Normalized\_Predicted\_BO\_LC} * P_{PF\_Normalized\_Predicted\_BO\_LC},$$

or $$P_{LC} = (W_{5QI} * P_{5QI} + W_{PF\_Normalized\_Predicted\_BO\_LC} * P_{PF\_Normalized\_Predicted\_BO\_LC}) * \text{maximum}(W_{GBR} * P_{GBR}, W_{PDB} * P_{PDB})$$

Here, $W_{PF\_Normalized\_Predicted\_BO\_LC}$ is the weight given to $P_{PF\_Normalized\_Predicted\_BO\_LC}$ and depends on the operator policies.

In addition, we also define "Normalized Predicted BO for a UE (or all its associated logical channels)" as follows: It is defined to be a sum of normalized predicted BOs for all the logical channels supported by the UE at a given point of time. For example, if $UE_i$ is carrying the traffic of two different LCs, one LC with 5QI 1 with its predicted BO being V1 and the average packet size (for 5QI 1) of A1, and another LC with 5QI 2 with its predicted BO being $V_2$ with average packet size (for 5QI 2) of $A_2$, the normalized predicted BO for $UE_i$ is computed as $(V_1/A_1)+(V_2/A_2)$. Depending on the operator policy, a fraction of "Normalized Predicted BO of the UE" can be used while computing the overall scheduling metric above, instead of taking the normalized predicted BO of a specific LC of that UE.

In an example sub-variant, prediction of BO is implemented for only selected 5QIs (e.g., only for high throughput, delay-sensitive applications, such as AR and/or VR), and not for all the applications.

Variant 2 of the method: In this example embodiment, normalized predicted BO for each LC is used to compute scheduling metric for each LC, as follows:

$$P_{LC} = W_{5QI} * P_{5QI} + W_{GBR} * P_{GBR} + W_{PDB} * P_{PDB} + W_{PF} * P_{PF} + W_{Normalized\_Predicted\_BO\_LC} * P_{Normalized\_Predicted\_BO\_LC} \text{ or}$$

$$P_{LC} = (W_{5QI} * P_{5QI} + W_{PF} * P_{PF}) * \text{maximum}(W_{GBR} * P_{GBR}, W_{PDB} * P_{PDB}, W_{Normalized\_Predicted\_BO\_LC} * P_{Normalized\_Predicted\_BO\_LC})$$

In the above expressions, $P_{Normalized\_Predicted\_BO\_LC}$ is the normalized value of predicted BO for that LC (and is normalized across all LCs corresponding to that 5QI in a given cell); and $W_{Normalized\_Predicted\_BO\_LC}$ is the weight given to $P_{PF\_Normalized\_Predicted\_BO\_LO}$ and depends on the operator policies.

In the example embodiment of Variant 2, we have added a priority factor corresponding to normalized predicted BO and the corresponding weight. For high data rate, low latency applications, the PDBs are small, but one can set the weight corresponding to normalized predicted BO relatively large to help influence the LC priority to schedule the data bursts.

In an example sub-variant, multi-step BO prediction for each LC is implemented for allocating radio resources. For example, in implementing a d-step prediction using the set of input observed values at 1, 2 . . . , k which are $X_1$, $X_2$, . . . $X_k$, (where d<k), we obtain d-step predicted output values $\hat{X}_{k+1}$, $\hat{X}_{k+2}$, . . . $\hat{X}_{k+d}$, as follows:

$X_1$, $X_2$, . . . $X_k$ are used to predict the output value at k+1, which is $\hat{X}_{k+1}$;

$X_2$, . . . $X_k$, $\hat{X}_{k+1}$ are used to predict the output value at k+1, which is $\hat{X}_{k+2}$;

$X_3$, . . . $\hat{X}_{k+1}$, $\hat{X}_{k+2}$ are used to predict the output value at k+1, which is $\hat{X}_{k+3}$;

. . . .

. . . .

$X_d$, . . . $\hat{X}_{k+d-2}$, $\hat{X}_{k+d-1}$ are used to predict the output value at k+1, which is $\hat{X}_{k+d}$; etc. until d-steps completed.

This procedure will be repeated. In this multi-step prediction, the previous predicted values are used as inputs for the next prediction output. The advantage of this method is that at time step k+1, we have all the predicted values up to the time step k+d, which are $\hat{X}_{k+1}$, $\hat{X}_{k+2}$, . . . $\hat{X}_{k+d}$. It should be noted, however, as the predictions are used as the input observed values in this embodiment, prediction errors may occur with the increasing value of d, and hence the value of d is kept below a selected threshold.

In another example sub-variant, a second multi-step BO prediction technique is used for allocation of radio resources. In this example embodiment, the time series of the next d output steps is predicted using the first k input steps in parallel. The multiple output strategy involves developing one model that is capable of predicting the entire forecast sequence in a one-shot manner. During the training phase, d-step prediction of outputs $\hat{X}_{k+1}$, $\hat{X}_{k+2}$, . . . $\hat{X}_{k+d}$ is implemented in a one-shot manner using the input observed sequence of values $X_1$, $X_2$, . . . $X_k$.

Variant 3 of the method: In this example embodiment, enhanced RRM methods are implemented at the gNodeB using the predicted CSI from the UE and the predicted traffic patterns. In this example embodiment, the predicted CSI is used (which can be provided to DU from the UE, e.g., using existing CSI prediction methods at UE) with the above-described Variant I or Variant II, and the RRM policies are further enhanced. After computing the scheduling metric for all the LCs of all the active UEs (as per Variant I or II), a constraint is imposed on top of the computed scheduling metric based on the predicted CSI to decide whether or not to serve a UE in a given slot (or to decide the amount of resource a given UE should be allocated in a slot). For example, in a scenario involving two UEs, UE1 and UE2, and time slot k, let's assume UE1 has a higher value of scheduling metric in slot k (compared to UE2) and a poorer CSI in slot k (compared to UE2), but UE1 has a better predicted CSI for the next few slots (compared to UE2). In this case, the example embodiment of Variant 3 can implement a policy in which UE2 is served in the slot k, even though the value of the scheduling metric for UE2 is lower than that of UE1, and UE1 is served a few slots later when UE1 would be experiencing better CSI.

Variant 4 of the method: In this example embodiment, multi-step BO prediction technique of Variant 2 and the predicted CSI (which can be provided to the DU from the UE using existing CSI prediction methods at UE) described in connection with Variant 3 are used for the resource allocation in each time-slot. The scheduling priority of a logical channel ($P_{LC}$) is determined as part of MAC scheduler using one of the following:

$$P_{LC} = W_{5QI} * P_{5QI} + W_{GBR} * P_{GBR} + W_{PDB} * P_{PDB} + W_{PF} * P_{PF}, \text{ or}$$

$$P_{LC} = (W_{5QI} * P_{5QI} + W_{PF} * P_{PF}) * \text{maximum}(W_{GBR} * P_{GBR}, W_{PDB} * P_{PDB})$$

These logical channel (LC) priorities are used to select UEs to serve in each time slot by the scheduler at the DU. Let's denote UE supporting LC k as UE(k), and let's consider the case where there are M active UEs in the current time-slot “s”. The scheduling priority of each logical channel (LC) k (which has data to send) is calculated, and these LCs are arranged in a queue in the descending order of their scheduling priorities. In this example embodiment, top few LCs are selected from this sorted queue, and resources are allocated to these LCs.

In the example embodiment of Variant 4, the following are performed for each LC k in the sorted queue in slot “s”:

a) Comparing relative channel conditions: Comparison is made of channel conditions of the UE(k) in slot “s”, 1) with other UEs which have LCs in the above sorted list in slot “s” and whose scheduling priorities are lower than that for LC k, and 2) with predicted value of channel conditions of the UE(k) and other UEs in the next few slots after slot “s”.

b) Comparing relative BO values: Comparison is also made of BO of LC k for UE(k) with predicted BO for UE(k) and other UEs in the next few slots.

In the example embodiment of Variant 4, each LC k (in a given slot “s”) from the sorted list of LCs is considered based on i) the scheduling priorities, ii) relative channel conditions (taking into account current and predicted values of channel conditions of the UEs in the system), and iii) relative BO values (taking into account current and predicted values of BOs for UEs in the system) to decide whether or not to serve this LC k in slot “s”. For example, LC k corresponding to UE(k) may have a higher value of scheduling priority compared to LC j of UE(j) in slot “s”, but the relevant policy may decide to serve LC j in slot “s” (and not LC k) if it will more efficient to serve LC j in the slot (compared to LC k) based on the relative channel conditions and the relative BO values (taking into account current and predicted values of these parameters). Variant 4 can be applied, e.g., for scenarios where it is possible to improve throughput of individual UEs or improve throughput at the cell level without violating other QoS (such as delay) constraints for these LCs.

While the present disclosure has been described with reference to one or more exemplary embodiments, it will be understood by those skilled in the art that various changes may be made and equivalents may be substituted for elements thereof without departing from the scope of the present disclosure. For example, although the example methods have been described in the context of 5G cellular networks, the example methods are equally applicable for 4G and other similar wireless networks. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

For the sake of completeness, a list of abbreviations used in the present specification is provided below:

5GC: 5G Core Network
5G NR: 5G New Radio
5QI: 5G QoS Identifier
ACK: Acknowledgement
AI: Artificial Intelligence
AM: Acknowledged Mode
AN: Access Network
APN: Access Point Name
AR: Augmented Reality
ARP: Allocation and Retention Priority
BO: Buffer Occupancy
BS: Base Station
CP: Control Plane
CU: Centralized Unit
CU-CP: Centralized Unit-Control Plane
CU-UP: Centralized Unit-User Plane
DL: Downlink
DDDS: DL Data Delivery Status
DNN: Data Network Name
DRB: Data Radio Bearer
DU: Distributed Unit
eNB: evolved NodeB
EPC: Evolved Packet Core
GBR: Guaranteed Bit Rate
gNB: gNodeB (next generation node B)
GTP-U: GPRS Tunneling Protocol-User Plane
IP: Internet Protocol
L1: Layer 1
L2: Layer 2
L3: Layer 3
L4S: Low Latency, Low Loss and Scalable Throughput
LC: Logical Channel
LSTM: Long Short-Term Memory (Neural Networks)
MAC: Medium Access Control
ML: Machine Learning
NACK: Negative Acknowledgement
NAS: Non-Access Stratum
NR-U: New Radio-User Plane
NSI: Network Slice Instance
NSSI: Network Slice Subnet Instance
O-RAN: Open Radio Access Network
PDB: Packet Delay Budget
PDCP: Packet Data Convergence Protocol
PDU: Protocol Data Unit
PHY: Physical Layer
QCI: QoS Class Identifier
QFI: QoS Flow Id
QoS: Quality of Service
QFI: QoS Flow Identifier
RAT: Radio Access Technology
RDI: Reflective QoS Flow to DRB Indication
RLC: Radio Link Control
RLC-AM: RLC Acknowledged Mode
RLC-UM: RLC Unacknowledged Mode
RNN: Recurrent Neural Networks
RQI: Reflective QoS Indication
RRC: Radio Resource Control
RRM: Radio Resource Management
RTP: Real-Time Transport Protocol
RTCP: Real-Time Transport Control Protocol
RU: Radio Unit
SCTP: Stream Control Transmission Protocol SD: Slice Differentiator
SDAP: Service Data Adaptation Protocol
SLA: Service Level Agreement
S-NSSAI: Single Network Slice Selection Assistance
SST: Slice/Service Type
TCP: Transmission Control Protocol
TEID: Tunnel Endpoint Identifier
tan h: Hyperbolic tangent
UE: User Equipment
UP: User Plane
UL: Uplink
UM: Unacknowledged Mode
UPF: User Plane Function
VR: Virtual Reality

The invention claimed is:

1. A method for implementing enhanced radio resource management of open radio access network (O-RAN) based on machine-learning-based technique, comprising:

sending, from a distributed unit (DU) of the O-RAN to a traffic prediction analytics module, values of at least one network performance parameter comprising buffer occupancy (BO) for a plurality of data radio bearers (DRBs) at 5G Quality of Service Identifier (5QI) level;

deploying, at the traffic prediction analytics module, a Long Short-Term Memory (LSTM) neural network comprising at least one LSTM unit for data traffic prediction of one of per-DRB data traffic or per-logical channel (LC) traffic for each one of a plurality of logical channels (LCs) based on the at least one network performance parameter; and deriving, by the traffic prediction analytics module based on at least the data traffic prediction, a set of parameters defining a policy for determining a scheduling priority of each one the LCs.

2. The method according to claim 1, wherein:

the traffic prediction analytics module is in one of a near-real time radio intelligent controller (near-RT RIC), a centralized unit (CU) of the O-RAN, or an analytics server.

3. The method according to claim 2, wherein:

the at least one network performance parameter further comprises at least one of cell load and characteristics of DU-to-CU mid-haul connection.

4. The method according to claim 3, wherein the traffic prediction analytics module is in a CU user plane (CU-UP).

5. The method according to claim 4, wherein the LSTM neural network is deployed for all of the plurality of DRBs.

6. The method according to claim 5, further comprising:

providing, by each of the plurality of DRBs, a prediction of channel state information (CSI);

wherein the set of parameters defining the policy for determining the scheduling priority is derived based on the prediction of CSI and the data traffic prediction.

7. The method according to claim 4, wherein the LSTM neural network is deployed for only DRBs carrying traffic for high-data-rate, low-latency applications.

8. The method according to claim 7, further comprising:

providing, by each of the plurality of DRBs, a prediction of channel state information (CSI);

wherein the set of parameters defining the policy for determining the scheduling priority is derived based on the prediction of CSI and the data traffic prediction.

9. The method according to claim 4, wherein the LSTM neural network is deployed for only some of the DRBs within the same 5QI.

10. The method according to claim 9, further comprising:

providing, by each of the plurality of DRBs, a prediction of channel state information (CSI);

wherein the set of parameters defining the policy for determining the scheduling priority is derived based on the prediction of CSI and the data traffic prediction.

11. The method according to claim 3, wherein:

the traffic prediction analytics module is in the near-RT RIC; and the DU sends to the near-RT RIC the BO for each DRB in a radio link control (RLC) queue at the DU.

12. The method according to claim 11, wherein the LSTM neural network is deployed for all of the plurality of DRBs.

13. The method according to claim 12, further comprising:

providing, by each of the plurality of DRBs, a prediction of channel state information (CSI);

wherein the set of parameters defining the policy for determining the scheduling priority is derived based on the prediction of CSI and the data traffic prediction.

14. The method according to claim 11, wherein the LSTM neural network is deployed for only DRBs carrying traffic for high-data-rate, low-latency applications.

15. The method according to claim 14, further comprising:

providing, by each of the plurality of DRBs, a prediction of channel state information (CSI);

wherein the set of parameters defining the policy for determining the scheduling priority is derived based on the prediction of CSI and the data traffic prediction.

16. The method according to claim 11, wherein the LSTM neural network is deployed for only some of the DRBs within the same 5QI.

17. The method according to claim 16, further comprising:

providing, by each of the plurality of DRBs, a prediction of channel state information (CSI);

wherein the set of parameters defining the policy for determining the scheduling priority is derived based on the prediction of CSI and the data traffic prediction.

* * * * *